US006328208B1

(12) United States Patent
Artino et al.

(10) Patent No.: US 6,328,208 B1
(45) Date of Patent: Dec. 11, 2001

(54) NETWORK CONNECTED NIGHT DEPOSITORY

(75) Inventors: Robert V. Artino, North Canton; Alan J. Rozlosnik, Louisville; Steven R. Davis, North Lawrence, all of OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/398,192

(22) Filed: Sep. 17, 1999

Related U.S. Application Data

(60) Provisional application No. 60/114,036, filed on Dec. 29, 1998.

(51) Int. Cl.[7] .......................... G06F 17/60

(52) U.S. Cl. .......................... 235/379; 902/8; 902/9

(58) Field of Search .......................... 235/379, 380, 235/382; 902/8, 1, 4, 5, 9; 705/35, 43

(56) References Cited

U.S. PATENT DOCUMENTS 4,245,902 * 1/1981 Cataldo et al. .......... 354/76
4,510,381 * 4/1985 Fukatsu .......... 235/379
4,540,106 * 9/1985 Fukatsu .......... 221/13
4,621,326 * 11/1986 Rawlins .......... 364/408
4,649,832 * 3/1987 Hain et al. .......... 109/24.1
4,733,765 * 3/1988 Watanabe .......... 194/206
4,754,126 * 6/1988 Caldwell .......... 235/379
4,991,008 * 2/1991 Nama .......... 358/108
5,012,075 * 4/1991 Hutchison et al. .......... 235/379
5,286,954 * 2/1994 Sato et al. .......... 235/379
5,780,825 * 7/1998 Sato et al. .......... 235/379
6,068,184 * 5/2000 Barnett .......... 235/379

* cited by examiner

*Primary Examiner*—Karl D. Frech
(74) *Attorney, Agent, or Firm*—Ralph E. Jocke; Daniel D. Wasil; Walker & Jocke

(57) ABSTRACT

A secure depository system (150, 158, 164, 180, 192) includes at least one secure depository (10, 152, 154, 160, 166, 168, 184, 194, 128). Deposits are enabled to be made into the secure depository by providing appropriate inputs to input devices (20, 22, 24) which are supported on a control panel (16). The control panel includes a processor (70) in operative connection with a data store (72). The data store includes data representative of inputs provided by authorized users who are authorized to operate the depository. Data concerning authorized users is delivered to the data store from a remote computer (174). Data concerning deposits made into the depository is stored in the data store and provided to the remote computer as well as to authorized service persons for purposes of auditing deposits made into the depository.

17 Claims, 34 Drawing Sheets

DIRECT CONNECT AHD (USING RS-232)

WALK-UP CONNECT AHD (USING RS-232)

MODEM CONNECT AHD (USING RS-232)

DIRECT CONNECT AHD (USING RS-485)

Note:
1=After a 25 second time-out the reader should cancel the transaction and return to the start.
2=Display message for 10 seconds and continue.
3=Display message for 5 seconds or until the "ENTER" key is pressed and continue with the program.
4=After a 15 second time-out the amount will be considered correct and continue with the program.

Button Panel

| Button Name | Description |
|---|---|
| Events button | Click on the Events button to display all events uploaded from the Automated Securomatic card reader to the PC. |
| Audit button | Click on the Audit button to print a report of all deposits that occurred after a specified time and date. The report prints at the PC's default printer. Use this feature to verify the deposits each time the vault is emptied. |
| Customers button | Click on the Customers button to view, add, modify, and delete customers in the database. You can also display transaction events for a specific customer. |
| Depository 1 - Connect button | Click on the Connect button for Depository 1 to connect the PC to the Depository 1 card reader for database changes and event transmission. Once the PC is connected to the card reader, the button changes to the Disconnect button. Click on the Disconnect button to disconnect the PC and the card reader. |
| Depository 1 - Send Data button | After you are connected to Depository 1 card reader, click on the Send Data button to download the reader configuration and the customer database to the card reader. |
| Depository 2 - Connect button | Click on the Connect button for Depository 2 to connect the PC to the Depository 2 card reader for database changes and event transmission. Once the PC is connected to the card reader, the button changes to the Disconnect button. Click on the Disconnect button to disconnect the PC and the card reader. |
| Depository 2 - Send Data button | After you are connected to Depository 2 card reader, click on the Send Data button to download the reader configuration and the customer database to the card reader. |
| Logout button | Click on the Logout button to log out the current operator. The Automated Securomatic Operator Login Window displays (Figure 18). A valid operator must log in to continue. If you click on the Exit button on the Automated Securomatic Operator Login Window, you will exit the system. |
| Exit button | Click on the Exit button to exit the Automated Securomatic software. |

Fig. 21

Status Panel Indicators

| Indicator | Color | Description | Action |
|---|---|---|---|
| Online | Green | Card reader is currently online to the PC. | No action is required. |
| | Red | Card reader is currently offline to the PC. | To connect to the card reader, click on the Connect button. |
| Tamper | Green | Door of the electronic access module (Figure 1-1) is secure. | No action is required. |
| | Red | Door of the electronic access module is open (Figure 1-1). | Investigate and secure the electronic access module of the Automated Securomatic. |
| Vault | Green | Depository vault capacity is acceptable. | No action is required. |
| | Red | Depository vault is full. | Empty the vault. |
| Paper | Green | Printer paper for the card reader is adequate. | No action is required. |
| | Yellow | Printer paper for the card reader is low. | Change the printer paper. Once red streaks begin to appear on the receipts the paper is almost gone and jams are likely to occur. |
| | Red | Printer for the card reader is out of paper. | Change the printer paper. |
| Database | Green | Card reader database is current. | No action is required. |
| | Red | Card reader database requires update from PC. | Click on the Connect button to connect to the card reader, and then click on the Send Data button to download the updated database to the card reader. |

Fig. 22

| Date | Time | Depository | Event | Alarm | Account Number | Deposit Amount | Bag Number |
|---|---|---|---|---|---|---|---|
| 28Jul-97 | 10:29:33AM | 1 | Deposit | No | 12345 | $0.12 | 0 |
| 28Jul-97 | 10:32:39AM | 1 | Deposit | No | 12345 | $1,234.56 | 123 |
| 28Jul-97 | 10:34:33AM | 1 | Deposit | No | 12345 | $350.00 | 1 |
| 28Jul-97 | 2:56:25PM | 1 | Deposit | No | 12345 | $1,111.11 | 123 |
| 28Jul-97 | 2:57:05PM | 1 | Deposit | No | 12345 | $5,556.32 | 565 |

NETWORK CONNECTED NIGHT DEPOSITORY

This application claim benefit to Provisional No. 60/114,036 filed Dec. 29, 1998.

TECHNICAL FIELD

This invention relates to banking machines. Specifically this invention relates to a secure depository system that operates in an unattended environment to accept deposited items from authorized users.

BACKGROUND ART

Unattended depositories are known in the prior art. Such depositories, which are sometimes referred to as "night depositories", are most often installed by banks. Such night depositories enable bank customers to make deposits to their account when the bank is closed. Customers of the bank input to the depository articles such as envelopes, bags or similar containers. The containers contain items for deposit such as checks, cash and credit slips. The deposited containers also generally contain a deposit slip to identify the entity making the deposit.

Users of a night depository place their deposit into the depository through an opening. Accessing the opening generally involves opening a door, slide or similar cover member. The secure depository generally includes a generally secure compartment. Deposited items are held in the secure compartment until an access door to the compartment is opened by an authorized person who has a lock combination, key or other suitable means for opening the secure compartment. The authorized person removes the deposited items. The items are then reviewed to determine what has been deposited and to verify that the deposited items conform with the associated deposit slip. Once the deposited items are counted and verified the appropriate account is credited.

Some secure depositories are intended to be used by consumers. Such depositories generally enable any person to place an item within the depository. Mechanisms are usually provided to prevent persons from attempting to "fish" items out of the depository. Because such depositories may be accessed by any person there is some risk of vandalism due to persons inserting destructive materials into the depository. Such materials may destroy deposits that have been placed in the depository.

Other depositories are designed to be used only by selected customers of the bank or other institution. Such depositories require a key to be accessed. Customers of the bank or institution who are authorized to insert deposited items into such depositories are provided with a key. The key may be used to unlock a depository door to access an opening so that an item may be deposited. While keys are a convenient way of restricting access to a depository they are also relatively expensive to produce. This is particularly true where several persons who work for a particular bank customer need to have keys so that they may make deposits. Keys are sometimes lost or stolen which results in a need to provide duplicate keys which is an additional cost.

One of the drawbacks associated with night depositories is that they provide no immediate record that the user has made the deposit. Disputes sometimes arise between institutions which accept deposits and customers as to whether a deposit was made. When a deposit cannot be accounted for there is often a question as to whether an employee of the customer may have misappropriated the deposit. There are sometimes questions as to whether employees of the bank or third party employees responsible for emptying the depository have misappropriated the deposit. In some cases such disputes are impossible to resolve.

Thus there exists a need for a secure depository that restricts operation to authorized users which is economical to install and operate and which provides immediate records of deposits so that disputes over lost deposits are reduced.

DISCLOSURE OF INVENTION

It is an object of the present invention to provide a secure depository system.

It is a further object of the present invention to provide a secure depository system that limits operation of the system to selected individuals.

It is an object of the present invention to provide a secure depository system that is remotely programmable for purposes of changing individuals who are authorized to operate the depository.

It is a further object of the present invention to provide a secure depository system that provides a user with a record of deposits made.

It is an object of the present invention to provide a secure depository system that provides electronic records of transactions.

It is a further object of the present invention to provide a secure depository system that provides electronic records of transactions conducted, which electronic records are remotely accessible.

It is a further object of the present invention to provide a secure depository system which provides image records related to transactions.

It is a further object of the present invention to provide a secure depository system which provides image records, which include images of both a user and an item deposited.

It is a further object of the present invention to provide a secure depository system which enables operation using different types of input devices such as a card, a key or manual inputs.

It is a further object of the present invention to provide a secure depository system that enables operation in response to a combination of inputs.

It is a further object of the present invention to provide a secure depository system that includes programmable operating instructions for providing a user with instructions for operating the depository through an output device.

It is a further object of the present invention to provide a secure depository system that makes information concerning transactions readily available for auditing purposes.

It is a further object of the present invention to provide a secure depository system which selectively provides an output to a service provider concerning the contents of the depository.

It is a further object of the present invention to provide a secure depository system that delivers remote indications of conditions which exist at the depository.

It is a further object of the present invention to provide a secure depository system which may be readily retrofit to operate in connection with an existing depository.

It is a further object of the present invention to provide a secure depository system which includes a depository suitable for use in an outdoor environment.

It is a further object of the present invention to provide a secure depository system that may be readily configured through use of a remote computer interface.

It is a further object of the present invention to provide a secure depository system that enables the depository to be integrated with an ATM or similar transaction processing network.

Further objects of the present invention will be made apparent in the following Best Modes for Carrying Out Invention and the appended claims.

The foregoing objects are accomplished in an exemplary embodiment of the present invention by a system which includes at least one secure depository. The depository includes a control panel, which control panel has at least one input device through which a user may input identifying information. The control panel preferably further includes a printer for providing a user with a receipt for transactions conducted at the depository.

In the exemplary form of the invention the control panel is retrofit to an existing depository. The retrofit installation is accomplished by removing a key cylinder conventionally used for unlocking the depository door. Removal of the key cylinder provides a key opening through which control wiring is run. The control wiring is in operative connection with an electrical actuator which is operative to change the depository door between locked and unlocked conditions. The electrical actuator in the exemplary embodiment is retrofit to the existing depository and provides the movement that was previously manually achieved through operation of the key cylinder.

The control panel of the exemplary embodiment includes a processor and a data store. The processor is in operative connection with one or more input devices and an output device. The data store includes data representative of instructions and programs for operating the depository. These instructions include output messages which are operative to prompt a user in operation of the depository. The data store further includes authorized user inputs and identifying data usable to identify and distinguish the secure depository from other depositories that may be connected in the system. The processor is further operative to store in the data store data representative of deposits made into the depository.

The exemplary embodiment of the present invention further includes an exterior camera for viewing a user positioned in an exterior area. An interior camera includes an interior field of view and is operative to view items deposited into the depository. The cameras are in operative connection with a recording device which records image data during transactions, which data includes images of users and the items deposited.

In the exemplary embodiment of the system the depository is in operative connection with a remote computer. The remote computer is operative to download data into the data store. The downloaded data includes configuration data. This configuration data includes data corresponding to the inputs to be made by authorized users to operate the depository. The remote computer is further operative to receive data concerning deposits made into the depository. Various types of connections may be used between the depository and the remote computer. Such connections may include dial-up connections such as through modems, a lease line connection, or connection through a local or wide area network. In alternative embodiments the depository may be connected through a TCP/IP connection to exchange data with various computers in a network. In addition or in the alternative, the depository may be connected to financial transaction processing networks such as an ATM network.

BRIEF DESCRIPTION OF DRAWINGS

FIG. 21 is a table including descriptions of icons displayed in the button panel of the main window shown in FIG. 20.

FIG. 22 is a table including an explanation of the status panel indicators shown in the main window shown in FIG. 20.

BEST MODES FOR CARRYING OUT INVENTION

Figure 1:
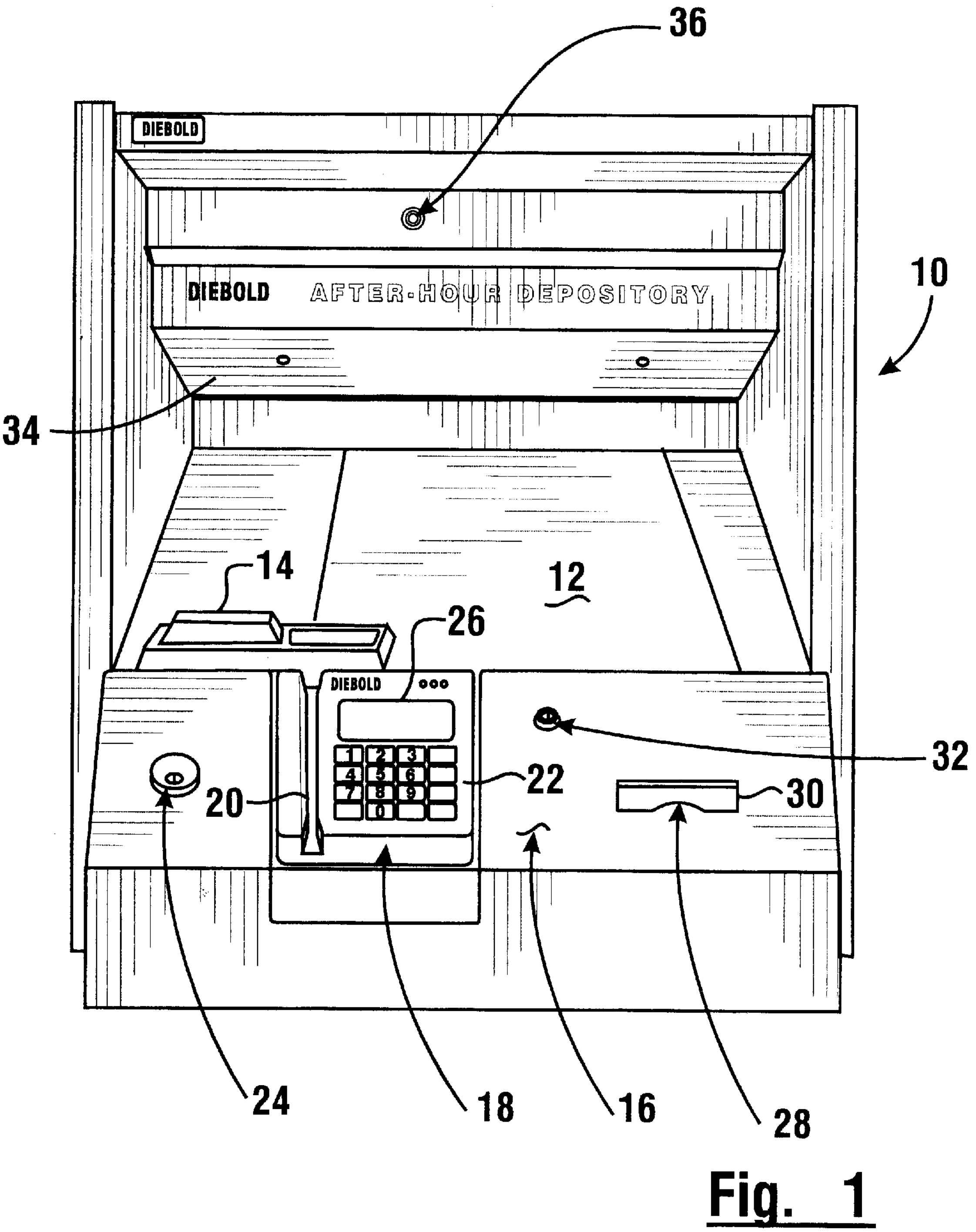
FIG. 1 is a front plan view of a secure depository used in connection with a first exemplary embodiment of a system of the present invention.

Referring now to the drawings and particularly to FIG. 1 there is shown therein an exemplary secure depository used in connection with a system of the present invention generally indicated 10. The secure depository includes a depository door 12. The depository door is enabled to be unlocked. When the depository door is unlocked it may be moved to provide access to an opening so that deposits may be placed therein. Depository door 12 is enabled to be moved manually by engagement of a handle 14.

Depository 10 further includes a control panel 16. Control panel 16 includes a user interface generally indicated 18. The user interface includes user input devices including a card reader 20. Card reader 20 in the exemplary embodiment is adapted for reading magnetic stripe type cards. Of course it should be understood that in other embodiments, other types of card readers or other article reading devices may be used. A keypad 22 includes a plurality of manually actuatable keys and serves as a further input device. In the embodiment shown the keypad 22 includes both numeric keys and function keys. User interface 18 further includes a key actuator 24 which also serves as an input device. Key actuator 24 is operative to accept appropriate keys and includes an element which enables an appropriate key to turn in the key actuator or otherwise provide an authorization input. Of course in other embodiments other types of input devices may be used.

User interface 18 further includes in the exemplary embodiment a display 26. Display 26 serves as an output device which provides output messages to users in the operation of the depository. The operation of display 26 to output user messages is later discussed in detail. User interface 18 further includes a receipt outlet 28. Receipt outlet 28 provides an opening for delivering printed receipts. Receipt outlet 28 generally includes a downward depending overlying member 30 (see FIG. 3). Overlying member 30 is operative to overlie a paper outlet opening in the face of the control panel so as to minimize the infiltration of contaminants into the interior of the control panel. Overlying member 30 also serves to prevent persons from pulling excess paper outward through the receipt outlet as later discussed. A control panel lock 32 is accessible on an exterior surface of the control panel and enables the control panel to be opened for purposes of accessing components in the interior thereof.

Depository 10 further includes a light fixture 34. Light fixture 34 provides illumination for the area adjacent to the depository door 12. Light fixture 34 also provides illumination to enable a user to operate the components on the control panel. A camera opening 36 extends through a panel on the front of the secure depository. As later discussed the camera opening enables a camera to capture images in an exterior field of view in an exterior area on the outside of the depository.

Figure 2:
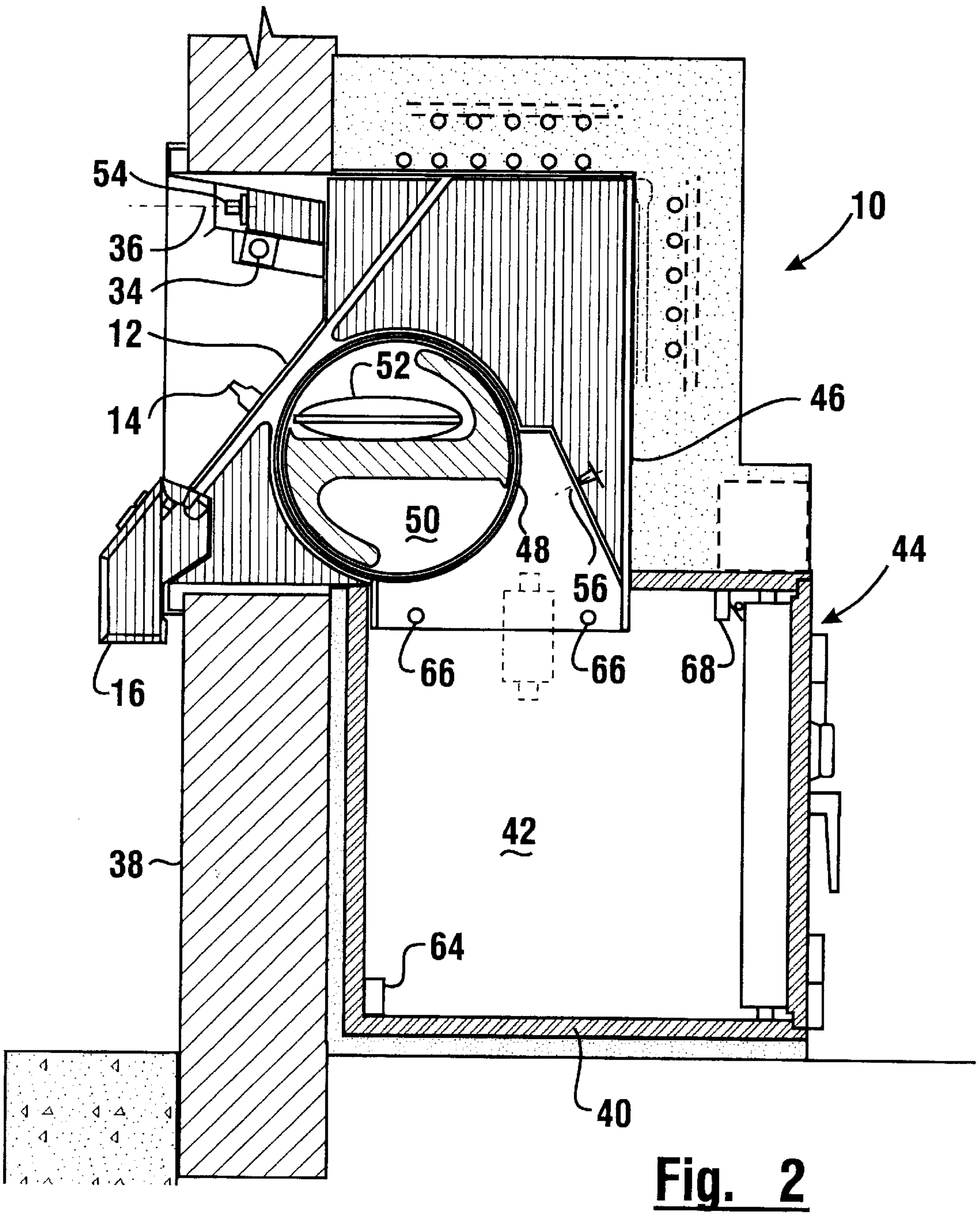
FIG. 2 is a side cross sectional view of a portion of the through the wall depository shown in FIG. 1.

FIG. 2 shows further features of the depository shown in FIG. 1. In this exemplary embodiment the depository is mounted so as to accept deposits through a wall 38. Wall 38 is preferably an exterior wall of a building but may be any of a number of different types of suitable wall structures. The wall structure in this embodiment along with the face of the depository, separate an exterior area where users of the depository and others are positioned, from an interior area which only service persons and other authorized personnel are to access. The depository further includes a chest 40 mounted on an interior side of the wall. The chest 40 generally bounds an interior area of the chest, generally indicated 42. Interior area 42 holds deposits which have been deposited into the depository. The chest includes a movable access door 44. Chest door 44 may be opened by authorized personnel to gain access to the chest interior area 42. Chest door 44 includes a suitable locking mechanism such as a combination lock as shown, and an appropriate boltwork for holding the chest door in a closed position when the lock is secured.

Depository 10 further includes a head portion generally indicated 46. Head portion 46 includes the depository door 12 and supports the control panel 16 in the exemplary embodiment. Head portion 46 further includes a rotatable drum generally indicated 48. Drum 48 includes in the embodiment shown, a pair of deposit accepting pockets 50 therein. Pockets 50 are sized for accepting deposits in the form of bags, sacks, envelopes, containers or other items that are expected to be deposited by authorized users into the depository. An exemplary deposit bag 52 is shown positioned in a pocket in drum 48. Drum 48 is driven by a mechanism, a motor or other suitable moving device preferably in a clockwise direction as shown. In this manner deposits which are placed in a pocket through the opening associated with door 12 are moved through rotation of the drum to a position where they fall into the chest interior area 42.

In the exemplary embodiment of the invention shown, an exterior camera 54 is positioned so that it has a field of view through the camera opening 36. The exterior camera 54 is operative to view users of the machine in the exterior field of view. Depository 10 further includes an interior camera 56. Interior camera 56 in the exemplary embodiment is positioned to view deposited items as they pass from the pockets in the drum 48 and move into the chest interior area 42. Interior camera 56 preferably is an infrared camera and has an interior field of view which includes deposits either in or moving into the interior area.

Figure 10:
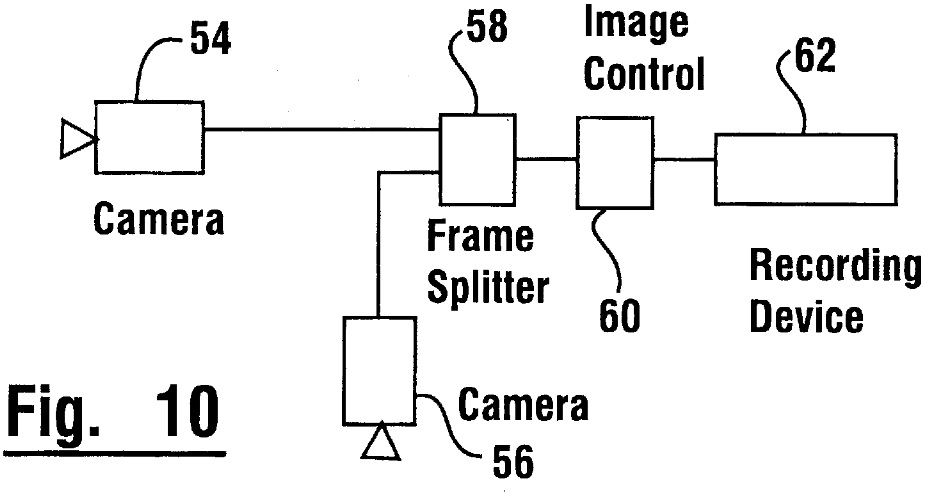
FIG. 10 is a schematic view of an image capture system used in connection with a secure depository in an exemplary embodiment of the invention.

As shown in FIG. 10 exterior camera 54 and interior camera 56 are connected to a frame splitter generally indicated 58. Frame splitter 58 is operative to enable recording of images from cameras 54 and 56 simultaneously in a single image frame. An image control device 60 is operative to control the capture of images and have the images recorded on a recording device 62. In the described embodiment of the invention the recording device may be an analog type video recording device which simultaneously records images from cameras 54 and 56 responsive to the image control device 60. Alternatively recording device 62 may be of the type shown in U.S. patent application Ser. No. 60/103,731 filed Oct. 9, 1998 and which is owned by the assignee of the present invention, the disclosure of which is incorporated herein by reference. Of course other types of recording devices and systems may be used.

As shown in FIG. 2, other sensors may be included for monitoring conditions of the depository 10 or components associated therewith. These include for example a seismic sensor 64. Seismic sensor 64 is operative to sense unusual vibrations of the depository, chest or adjacent structures, which may be indicative of an attack. Deposit level sensors schematically indicated 66 are positioned as shown. Deposit level sensors 66 may be photoelectric type sensors or one or more other suitable sensors for sensing the level of deposits which have accumulated in the interior area 42. One or several such sensors may be provided for sensing the level of accumulated deposits. Another sensor shown schematically is a door sensor 68. Door sensor 68 is operative to sense whether the chest door 44 is open or closed. Of course these sensors are exemplary and in other embodiments other types of sensors may be used.

Figure 11:
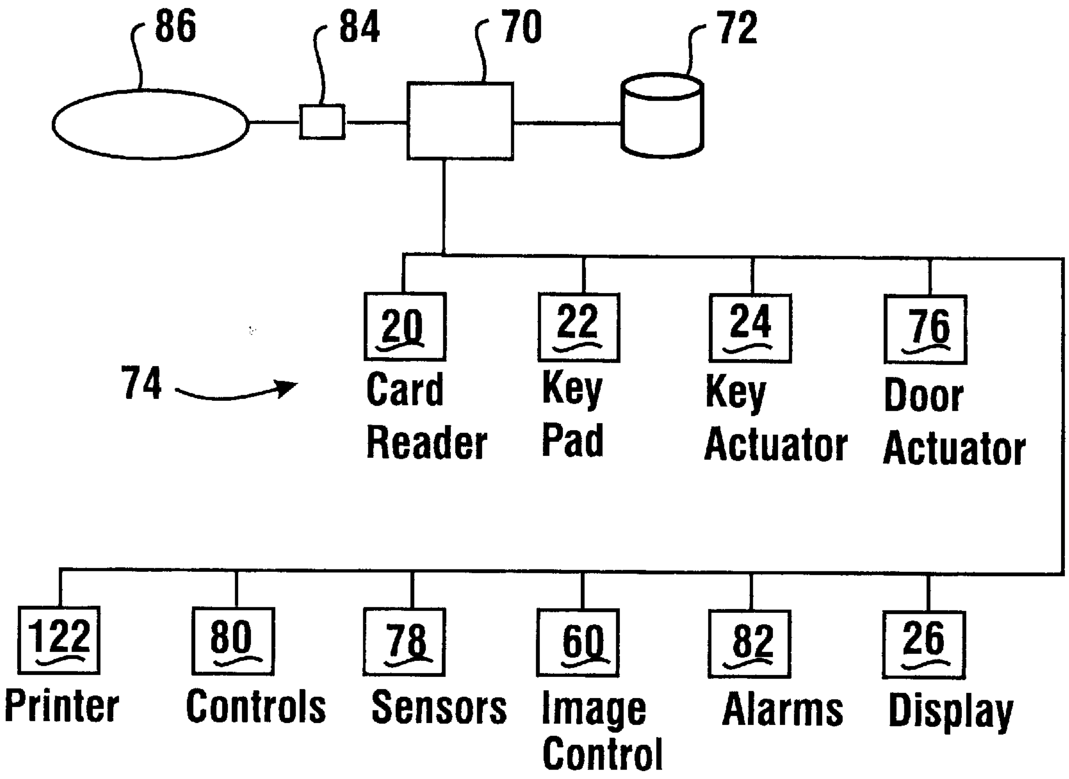
FIG. 11 is a schematic view of the control architecture used in connection with a depository in an exemplary embodiment of the present invention.

FIG. 11 schematically represents the control circuitry used in connection with an exemplary secure depository employed in a system of the present invention. The circuitry includes a processor schematically indicated 70 which is in operative connection with a data store 72. It should be understood that while only one processor and data store is discussed, the processor and data store may be comprised of a plurality of connected processors and data stores. The data store is operative to include programs and other data used in the operation of the depository. For example the data store includes data representative of an identifier which identifies the particular secure depository and distinguishes it from other depositories that may be connected in the system. The data store further includes data representative of authorized user inputs which are received to identify a particular user as one who is authorized to operate the depository. The data store 72 may further include authorized service entity inputs. Such service entity inputs may be used to identify a servicer as one who is authorized to access the interior area of the machine. The data store 72 may also include programs which operate to provide an authorized servicer with information or receipts concerning deposits in the machine.

The data store in the exemplary embodiment farther includes programmed instructions for operation of the machine. This may include for example the logic flow which the machine executes to receive user deposits. Data representative of the output messages displayed on the output device in connection with various steps in the logic flow are also preferably stored in the data store. These output messages serve as prompts which guide a user in operation of the depository. The data store further includes data representative of inputs. This includes for example data concerning users who have operated the depository and amounts or items which are indicated as deposited. The data store further includes data representative of a number of deposit amounts as well as other information that is desirable for operation of the system. Of course the configuration of the depository is programmable as later described so as to facilitate its operation in a number of different ways and in response to a variety of different user inputs.

As shown in FIG. 11 the processor 70 is in operative connection with numerous devices schematically indicated 74. The processor is operative to send and/or receive messages from the various devices through appropriate interfaces. The devices include in this exemplary embodiment the input devices which are the card reader 20, keypad 22 and key actuator 24. The processor is also in operative connection with the display 26 which operates to provide the output messages. The processor 70 is also in operative connection with the image control device 60 so that the images of the user and the item that they have deposited may be captured in the manner later explained.

The processor is also in operative connection with an actuator 76 which is operative to change the condition of the depository door 12 between a locked and an unlocked condition. The processor 70 is also in operative connection with sensors schematically indicated 78 such as sensors 64, 66 and 68 previously described. Sensors are also preferably provided for sensing the open or closed position of the control panel. Sensors 78 also preferably include sensors adjacent to the depository door which provides inputs and signals to the processor indicative of the open or closed position thereof. Motor controls or other moving mechanisms or sensors schematically indicated 80 such as controls for moving drum 48 or for sensing or controlling its position are also in operative connection with the processor 70. Alarm devices schematically indicated 82 are in operative connection with the processor and are operative to provide indications or other signals indicative of alarm conditions.

Figure 38:
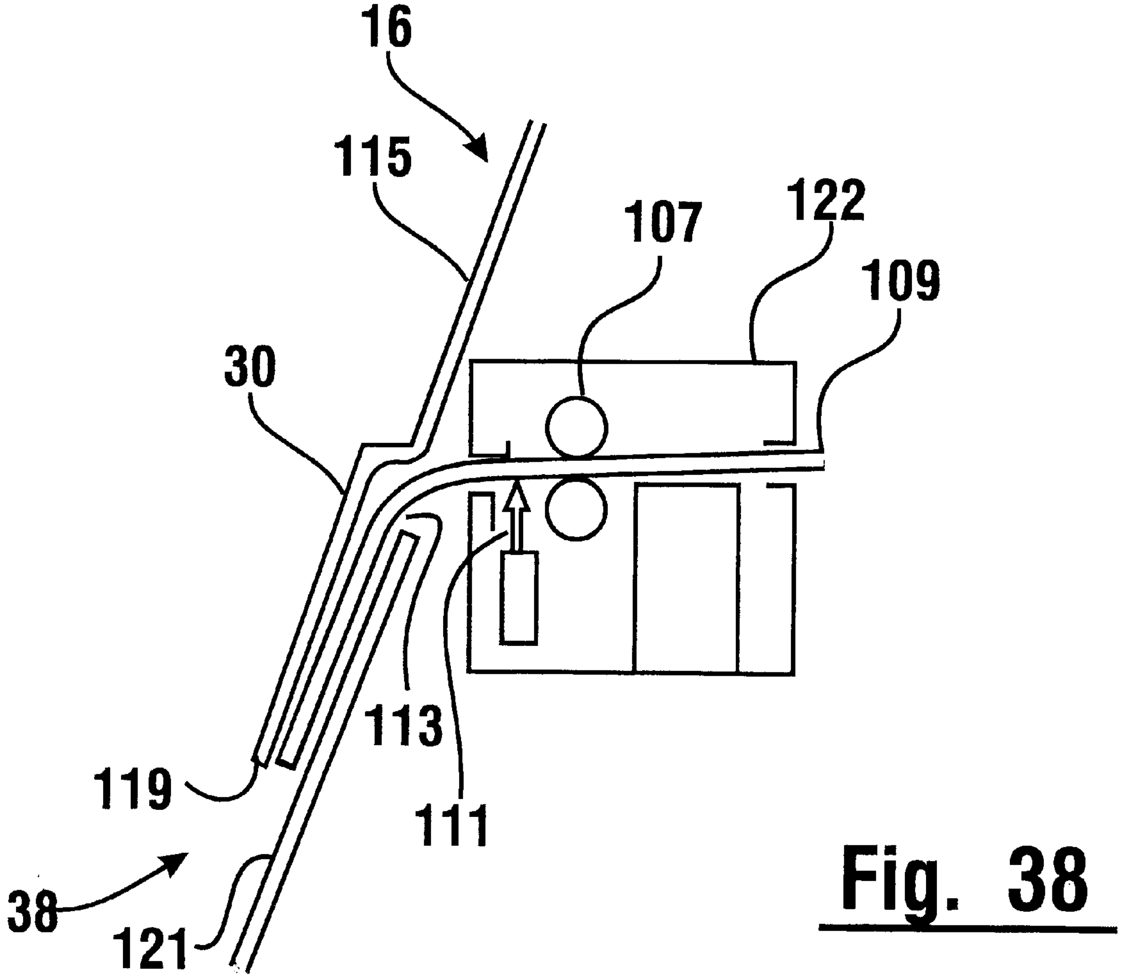
FIG. 38 is a schematic cross sectional view of the control panel used in the exemplary embodiment of the invention, including the receipt printer and receipt outlet.

In the exemplary embodiment the devices 74 further include a printer 122. Printer 122 is operative responsive to signals from the processor 70 to print receipts or other documents. Printer 122 further includes a paper drive 107 as schematically indicated in FIG. 38. The paper drive is operative to move the paper schematically indicated 109, as printing is conducted thereon. The printer 122 also includes a cutter schematically indicated 111. The cutter 111 is operative responsive to signals from the processor to cut the web of paper 109 that is moved through the printer responsive to the drive 107. In the exemplary embodiment the printer is supplied with paper from a replaceable paper roll which is housed in the interior of the control panel 16. The printer 122 also includes sensing devices for sensing when the paper supply is low and/or depleted. In response to sensing a low or depleted paper supply or other conditions, the printer is operative to send signals indicative of the sensed condition to the processor.

In the exemplary embodiment the printer is operated responsive to signals from the processor to produce receipt documents from the paper 109. The receipt documents reflect transactions conducted at the depository. The configuration of the paper path within the printer and the control panel is such that printed receipts may be taken by a user from the overlying member 30 only in a manner which prevents a user from prematurely grasping the receipt or pulling out excessive paper. The processor is operative to control the length of paper comprising the receipt, and the configuration of the overlying member 30 is such that a user cannot fully grasp the receipt document until the document is printed and the paper is cut or at least ready to be cut. This minimizes the risk that a user will prematurely pull on a receipt and damage the printer or pull out extra paper.

Figure 39:
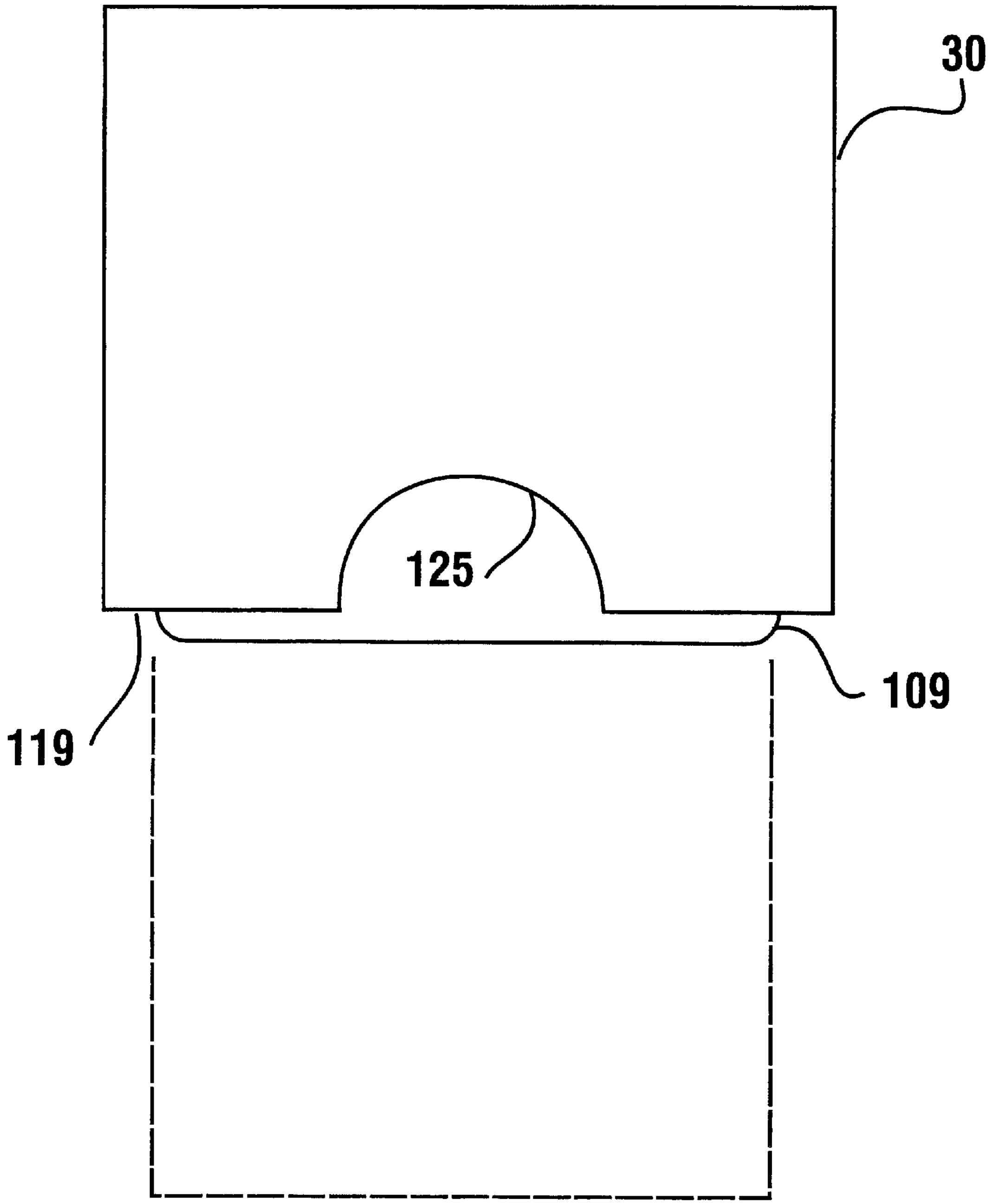
FIG. 39 is a plan view of the receipt outlet shown in FIG. 38.

In the exemplary embodiment these desirable features are accomplished by the configuration of the overlying member 30, which overlies an opening 113 in a wall 115 of the control panel. The overlying member extends generally downward from above the opening 113 to a lower edge 119. The length of the overlying member 30 from the opening 113 to the lower edge 119 is sufficient to enable a substantial portion of the length of a receipt to extend therein. An interior surface of the overlying member 30 is disposed from a exterior wall surface 121 of the control panel a sufficient distance to enable the receipt paper to pass therethrough. However the distance between the interior of the overlying member 30 and the wall surface 121 is sufficiently small so that a user's fingers cannot be generally extended into the space therebetween. The overlying member 30, as best shown in FIG. 39, includes a aperture 125 that extends into the overlying member from the lower edge 119. The aperture is generally centered relative to the path of the receipt paper and is sized to accept a user's finger therein. In the exemplary embodiment the aperture 135 is sized such that a user's thumb may be extended in the aperture.

In the exemplary embodiment the printer 122 operates to print indicia on the paper to produce the receipt. The printing is generally controlled responsive to the processor such that the length of the receipt when printed does not extend substantially outward beyond the lower edge 119 of the overlying member 30. With the receipt in this position as shown in FIG. 39 a user is enabled to extend their thumb or other finger through the aperture 135. As a result the receipt is engaged in sandwiched relation between the finger of the user and the exterior wall surface 121 of the control panel underlying the receipt.

With the receipt engaged in sandwiched relation between the user's thumb or other finger and the exterior wall of the control panel, the user is enabled to move the receipt downward to pull it out from underneath the overlying member. In embodiments of the invention which include an automatic cutter 111, the receipt is preferably cut at generally the time that the receipt extends in underlying relation of the aperture. This enables the user to remove the form but prevents the user from engaging the form prematurely and pulling extra paper out of the machine. Once the user has engaged the form and moved it with their thumb further downward away from the underlying member as shown in phantom in FIG. 39, a user is enabled to grasp the receipt form between their fingers and remove it.

It should be understood that although in the exemplary embodiment an active cutter for the receipt paper is shown, alternative embodiments may include passive type cutters. Such cutters may be operative to cut the paper in response to the force applied to the paper by a user's finger in removing the form. It should further be understood that although in the exemplary embodiment the aperture 125 extends from an edge of the overlying member, in other embodiments the aperture may be surrounded by the overlying member or otherwise supply sufficient access which enables applying enough force with a finger to move the paper while preventing the paper from being grasped prematurely. It should further be understood that while the exemplary embodiment has the paper removed through downward movement, other embodiments may provide for removal of the receipt forms in other directions.

It should be understood that embodiments of the invention may employ various types of printers. These may include for example thermal printers, impact printers, inkjet printers, laser printers or other printer types. Embodiments of the invention may include less than all the devices shown in the exemplary embodiment or additional devices. It should be understood that devices 74 are exemplary and other embodiments of the invention may include different types of devices.

Processor 70 is also in operative connection with an interface device schematically indicated 84. Interface device 84 may be a communications device such as a modem or other communication line interface which enables continuous or periodic connection through a communications system or network schematically indicated 86.

Figure 6:
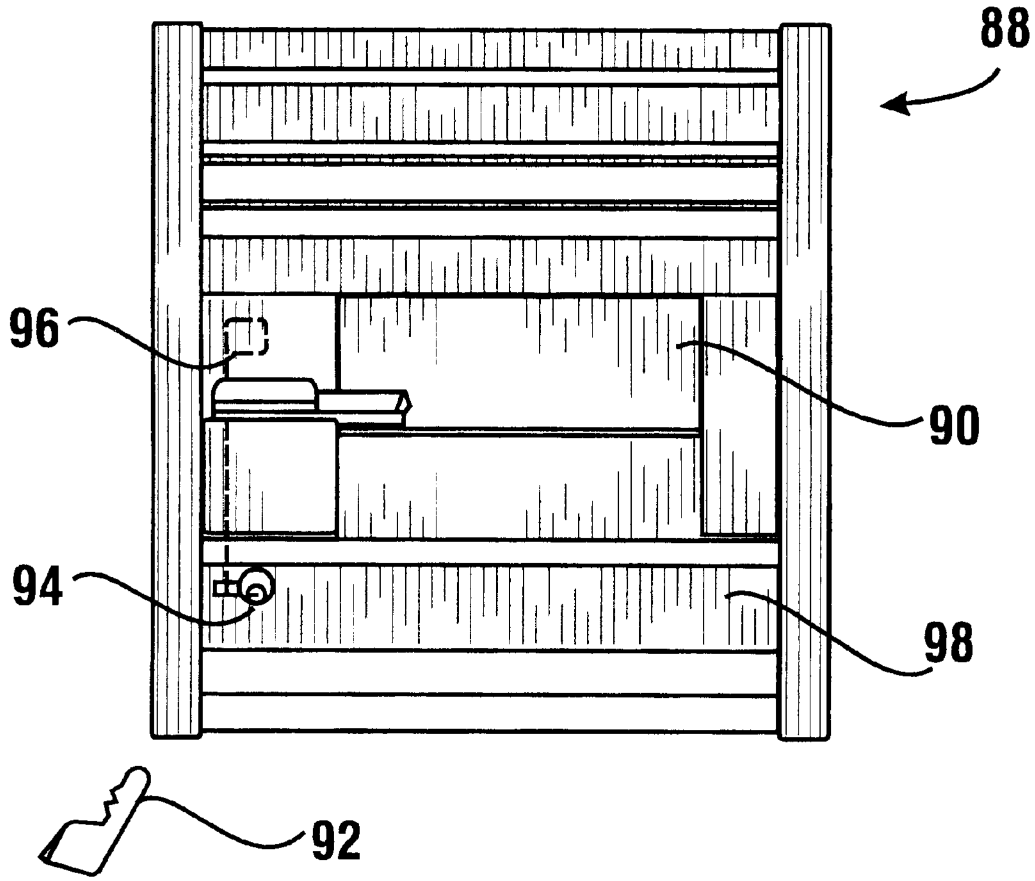
FIG. 6 is a front plan view of a through the wall key actuated depository suitable for retrofit with a control panel and for use in connection with a system of the present invention.

In the exemplary form of the secure depository, a control panel 16 is retrofit to an existing depository to provide configurable automated access capability when used in connection with the system. FIG. 6 shows an example of an exemplary through the wall type depository prior to conversion generally indicated 88. The depository 88 has a depository door 90 which is enabled to be unlocked by insertion of a key schematically indicated 92 into a key cylinder 94. As schematically indicated, turning the key in the key cylinder is operative to trip a mechanical lock actuator 96 which is operative to unlock door 90 and enable it to be opened. Key cylinder 94 extends through a key opening in a cover panel 98 as well as into the interior area of the depository. Of course this key cylinder is exemplary and electronic, magnetic, inductance or other types of unlocking devices operated responsive to keys, tokens, modules or other portable devices may be used in alternative embodiments.

Figure 5:
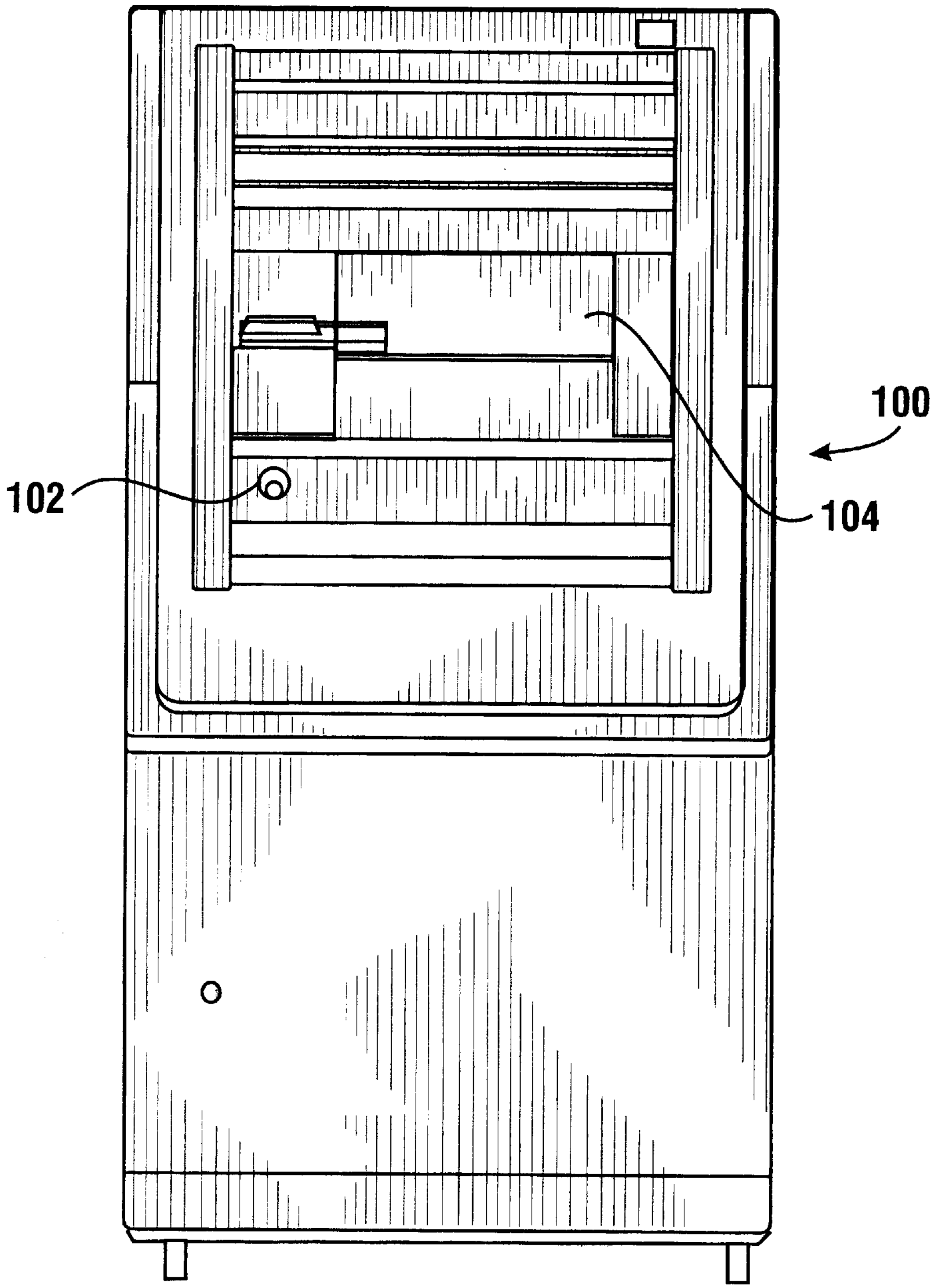
FIG. 5 is a front plan view of a freestanding key actuated depository suitable for retrofit with a control panel used in connection with a system of the present invention.

FIG. 5 shows a similar key actuated depository 100. Depository 100 is similar to depository 88 except that it is generally freestanding rather than mounted through a wall. An enclosure separates the exterior area of the depository 100 from the interior area. Actuation of a key cylinder 102 with appropriate keys (or other locking/unlocking device) enables depository door 104 to be opened by authorized users.

Figure 3:
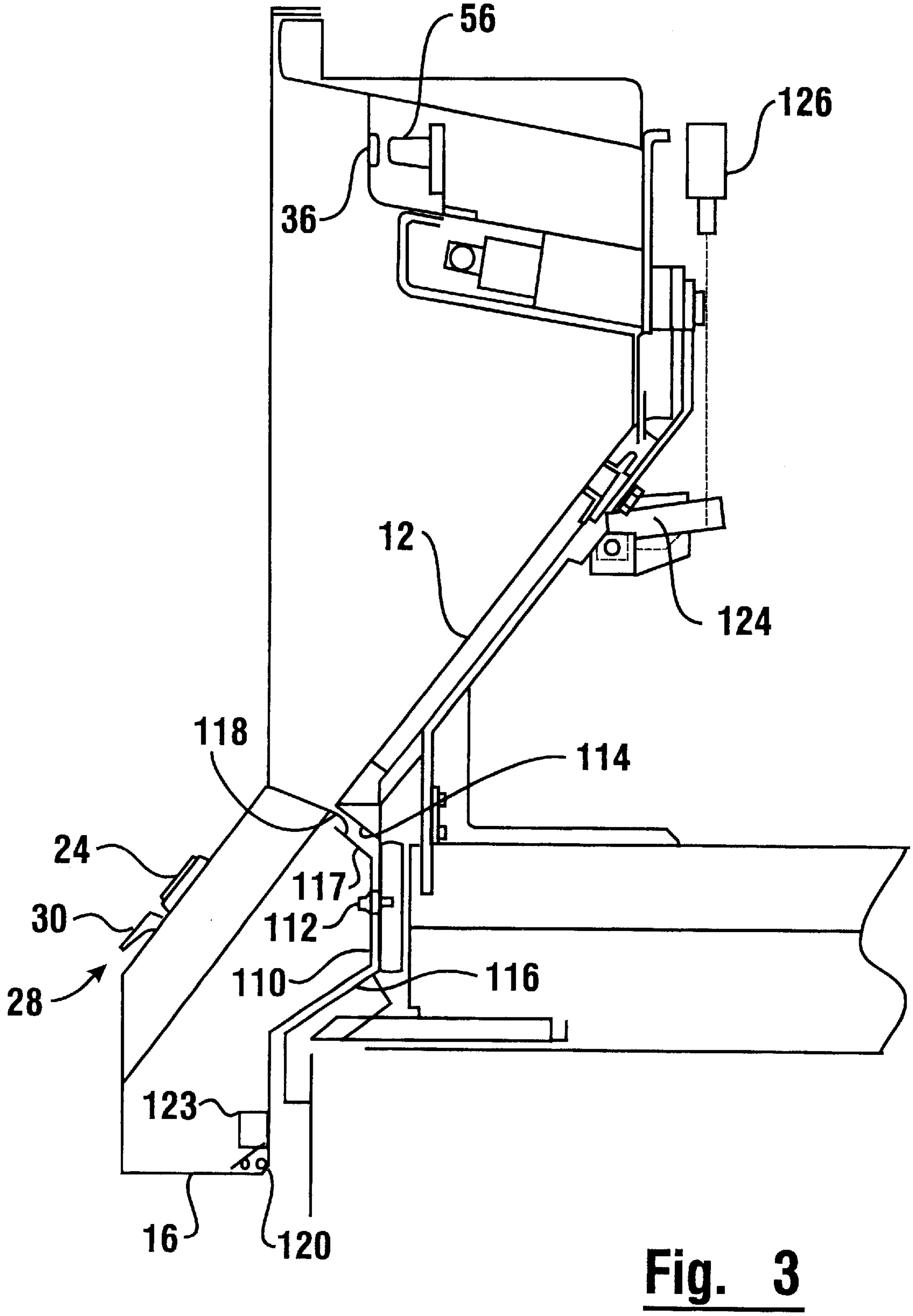
FIG. 3 is an enlarged side cross sectional view of a portion of the depository shown in FIG. 1.
Figure 4:
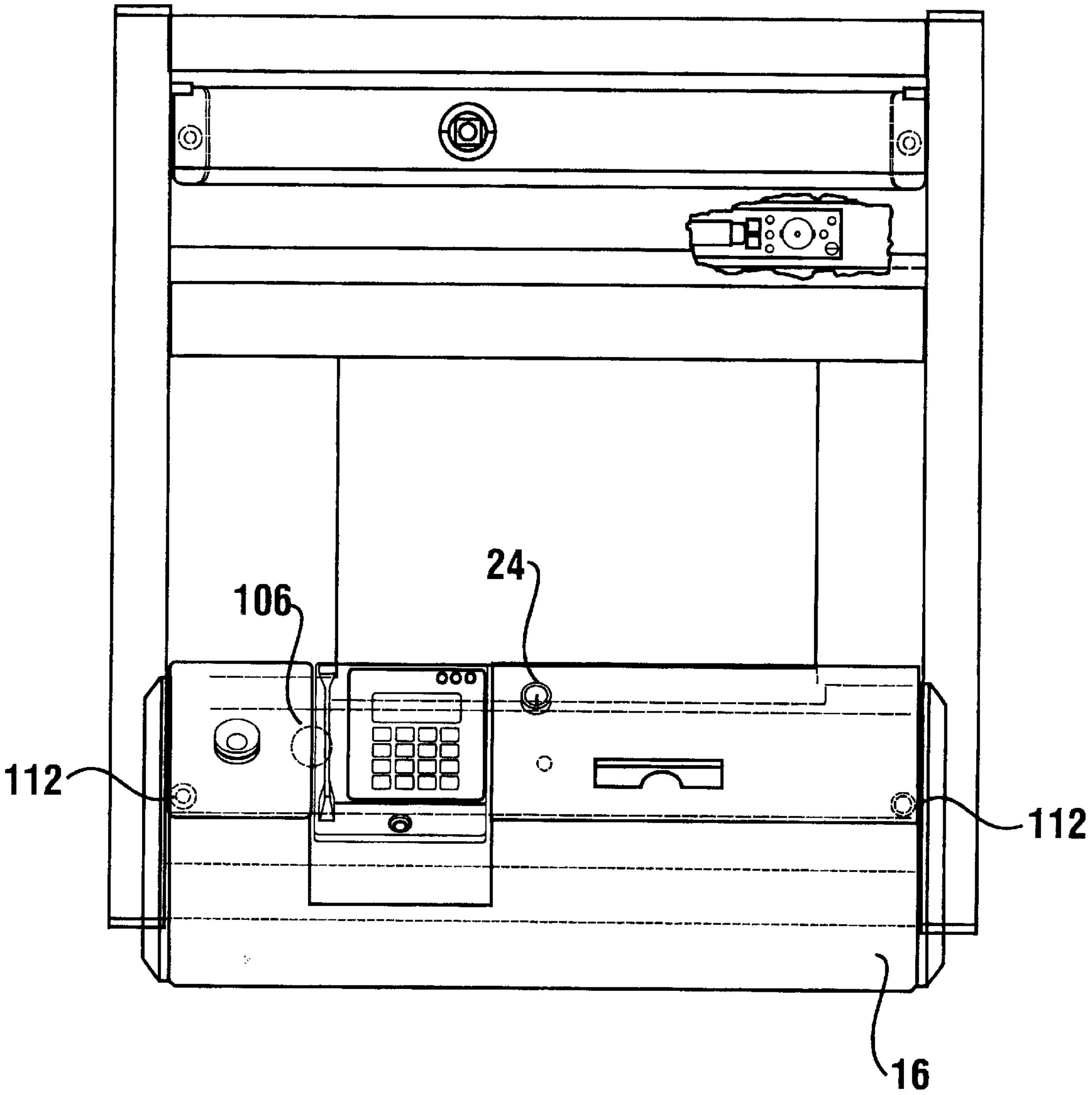
FIG. 4 is a front, partially sectioned view of the depository shown in FIG. 1.

As shown in FIG. 4 the installation of the control panel 16 to an existing depository to produce the depository 10 generally includes removal of the existing mechanical key cylinder from a key opening 106 through which the key cylinder previously extended. This provides an access opening into the interior area of the depository through which control wiring schematically indicated 108 is extended. The control wiring enables the input devices and other mechanisms in the control panel to communicate with and operate mechanisms in the interior area of the depository. As can be appreciated from FIGS. 3 and 6 a control panel 16 in the exemplary embodiment is mounted in place of a cover panel through which the key cylinder previously extended.

Figure 7:
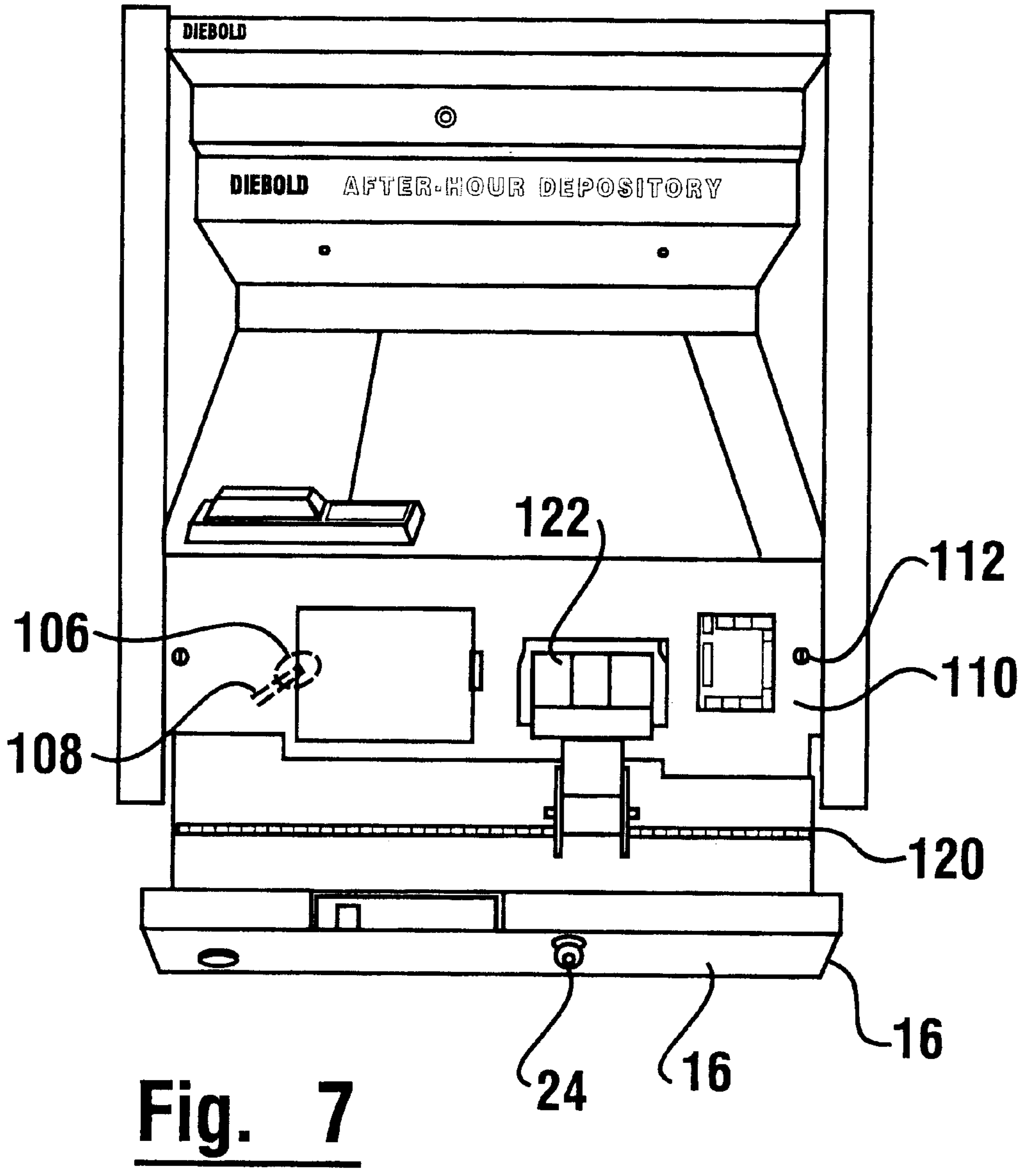
FIG. 7 is a view similar to FIG. 1 with the control panel shown in an open condition.

The control panel has a rear wall 110 which is accessible when the control panel is open as shown in FIG. 7. Fasteners schematically indicated 112 extend in supporting connection with the rear wall 110 so as to secure the control panel to a face 114 of the depository (see FIG. 3). In the preferred form of the exemplary embodiment, the face of rear wall 110 adjacent to the depository is disposed outward from the face 114. This produces a fluid conduit 116 which extends between the face 114 and wall 110. This enables rain, water and other materials to flow downward and around the rear of the control panel 16. An upper surface of the control panel 16 includes a lip 118 which in the operative closed position of the control panel overlies the outward depending surface 117 of the rear wall. The lip 118 further guides water passing downward behind the control panel into the fluid conduit 116. This minimizes the risk of water infiltration into the interior area control panel.

As shown in FIG. 7 the control panel includes a hinge 120 at a lower portion thereof. Hinge 120 enables readily moving the outer face of the control panel between the open and closed positions. This facilitates mounting the control panel into supporting connection with the depository. This construction also enables readily accessing components mounted in supporting connection within the control panel such as the receipt printer 122, as well as receipt paper, print ribbons and other components used in connection therewith. As shown, for example in FIG. 38, the receipt printer 122 and other components may be located in an interior area of the control panel 16 retrofit to an existing depository. Control panel 16 of the exemplary embodiment also houses the input devices and output device, the processor and the data store. The face of the control panel may be opened for accessing circuit boards, card readers and other components which require adjustment or replacement. A sensing switch 123 schematically shown in FIG. 3 is provided for sensing whether the panel is open or closed. It should be noted that in the described embodiment the control panel is opened using key actuator 24 which is opened using an appropriate key. Of course in other embodiments other types of secure actuators may be used.

As shown in FIG. 3 depository door 12 is changed between the locked and unlocked condition responsive to the position of a lock member 124. Prior to being retrofit with the control panel, the lock member 124 is moved responsive to turning of a key cylinder extending through the face of the depository. To enable operation in response to inputs from the input devices on the control panel 16, an electrical actuator schematically indicated 126 is operatively connected to the lock member 124. Actuator 126 is in operative connection with the processor through an appropriate interface. This enables the depository door 12 to be unlocked responsive to proper predetermined inputs to the input devices.

The actuation of the electrical actuator 126 responsive to the processor enables the actuator to unlock the depository door responsive to the program instructions stored in the data store. This may include for example opening the depository door responsive to a single proper card input through the card reader. Alternatively opening the depository door may require a single numerical input through the keypad. Alternatively the electrical actuator 126 may be actuated responsive to insertion of a proper key into the key actuator. In other exemplary embodiments several types of proper inputs may be required before the electrical actuator 126 will change the condition of the depository door between the locked and the unlocked conditions.

It should further be understood that while in the exemplary embodiment a single electrical actuator is used, in other embodiments additional or different types of actuators may be used for changing the condition of the depository door between the locked and the unlocked conditions. These may include for example linear type actuators, rotator type actuators or other appropriate actuators for purposes of achieving the desired result. It should further be appreciated that in the exemplary embodiment the control panel is installed in a manner so that the security of the depository is maintained. No substantial new openings are required in the existing depository structure to install the control panel. In the event that the control panel is compromised, its removal or attempts to corrupt its circuitry will not provide access to deposited items in the interior area of the depository.

The retrofit process for producing depository 10 also includes the installation of the system for capturing images. In an exemplary embodiment the exterior camera 54 is mounted in supporting connection with the face of the depository in a panel which includes camera opening 36. In existing depositories made by Diebold, Incorporated and others the exterior camera supporting panel replaces an envelope holding bin or tray positioned above the light fixture 34. In retrofitting the depository, the existing envelope holding structure is removed and a new exterior camera supporting panel substituted in its place. The wires from the exterior camera are preferably run into the interior area of the depository through openings used for the existing light fixture wiring or other available small openings that do not pose a security risk. Because the exterior camera 54 is relatively small, embodiments of the invention may provide for an envelope holding area in the camera supporting panel. This allows users who require envelopes to have a ready source of such items in the usual location.

The interior camera 56 is retrofit to the depository in the interior area. The interior camera is preferably an infrared camera or other camera suitable for capturing images in the usual near total darkness of the interior area. In alternative embodiments, other cameras and sources of illumination suitable for capturing images of deposited items may be installed. In the described embodiment the interior camera 56 is installed such that its field of view includes the area where the deposited articles can be viewed. As shown in FIG. 2, in the exemplary embodiment the field of view of the interior camera generally includes the pocket of the drum 48 in a position where the deposited item passes out of engagement with the drum. In this configuration the interior camera 56 is in supporting connection with a wall bounding an area in the head portion 46 adjacent to the rotating drum. Of course this mounting is exemplary and in other embodiments other camera positions and mountings may be used.

In the described embodiment the depository and related facility is retrofitted to include the frame splitter 58, image control device 60 and recording device 62. Preferably these items are positioned in the interior area or other location in the facility where they are not accessible to users or unauthorized persons. The components are preferably positioned in locations where they may be accessed by authorized persons for repair and maintenance purposes, and for changing recording media, if required.

Appropriate wiring connections are provided between the cameras, the image control device, frame splitter, recording control device, control panel and other components. These connections enable the system to capture images of both the user and the deposited items at the desired programmed times during transactions so that visual records are produced. The use of the frame splitter in the described embodiment enables capturing images of both the user and the items the user deposited in a single stored image frame.

Figure 9:
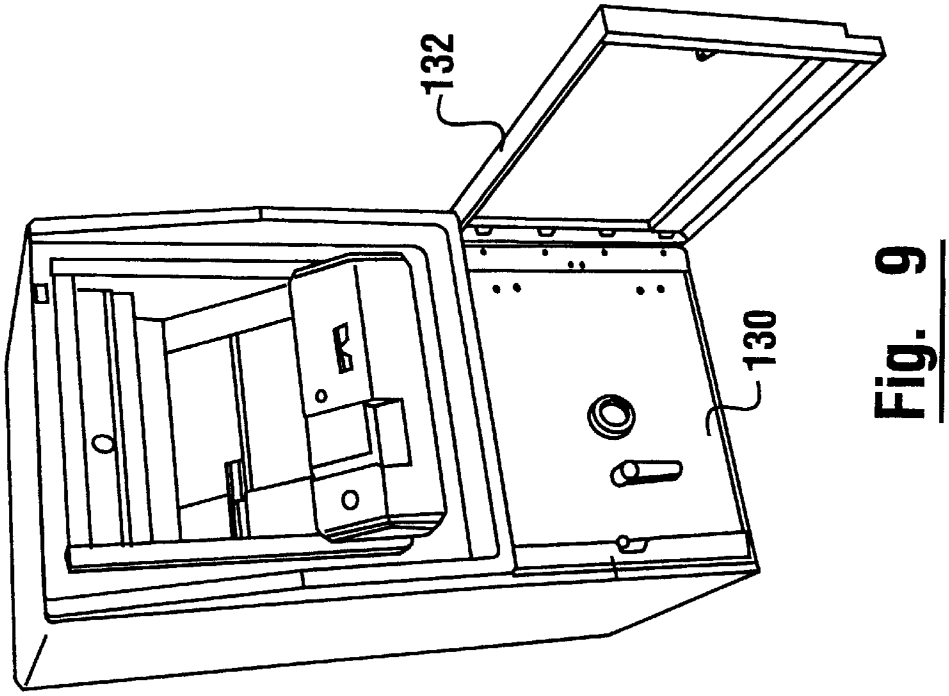
FIG. 9 is a view similar to FIG. 8 with the freestanding depository shown with its lower cover in an open position providing access to the depository door.
Figure 8:
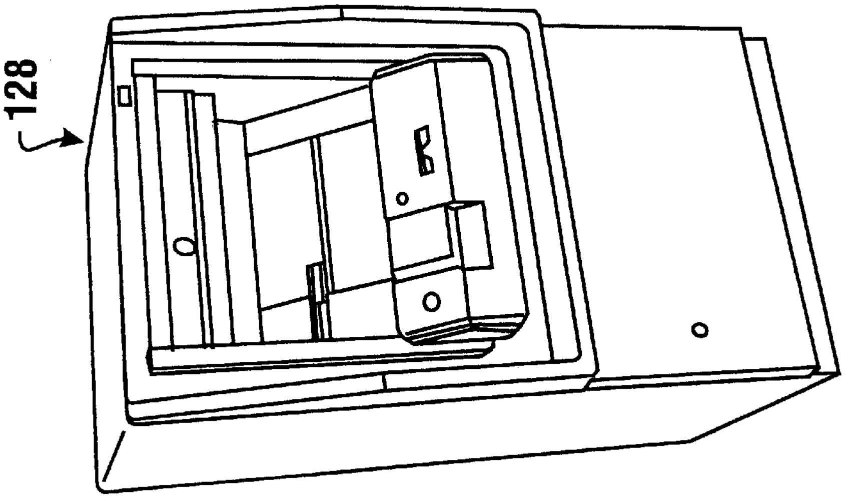
FIG. 8 is an isometric view of a freestanding depository of the type shown in FIG. 5 retrofitted with a control panel.

It should further be understood that the present invention may be used with various types of depositories. For example FIGS. 8 and 9 show a freestanding type depository 128. Freestanding depository 128 is similar to the through the wall depository previously discussed, except that it is freestanding within a lobby or other area. Such units may further be built or retrofit with a control panel of the type previously described and as shown in the unit in FIGS. 8 and 9. As represented in FIG. 9 the freestanding unit 128 has a chest door 130 which may be opened by appropriate personnel by actuating a combination lock or similar appropriate lock. In the lobby unit shown, a locking decorative cover 132 is positioned to selectively overlie the chest door 130 so as to enhance the attractiveness of the unit as well as to discourage unauthorized persons from tampering with the combination lock or similar locking device on the chest door.

Figure 17A:
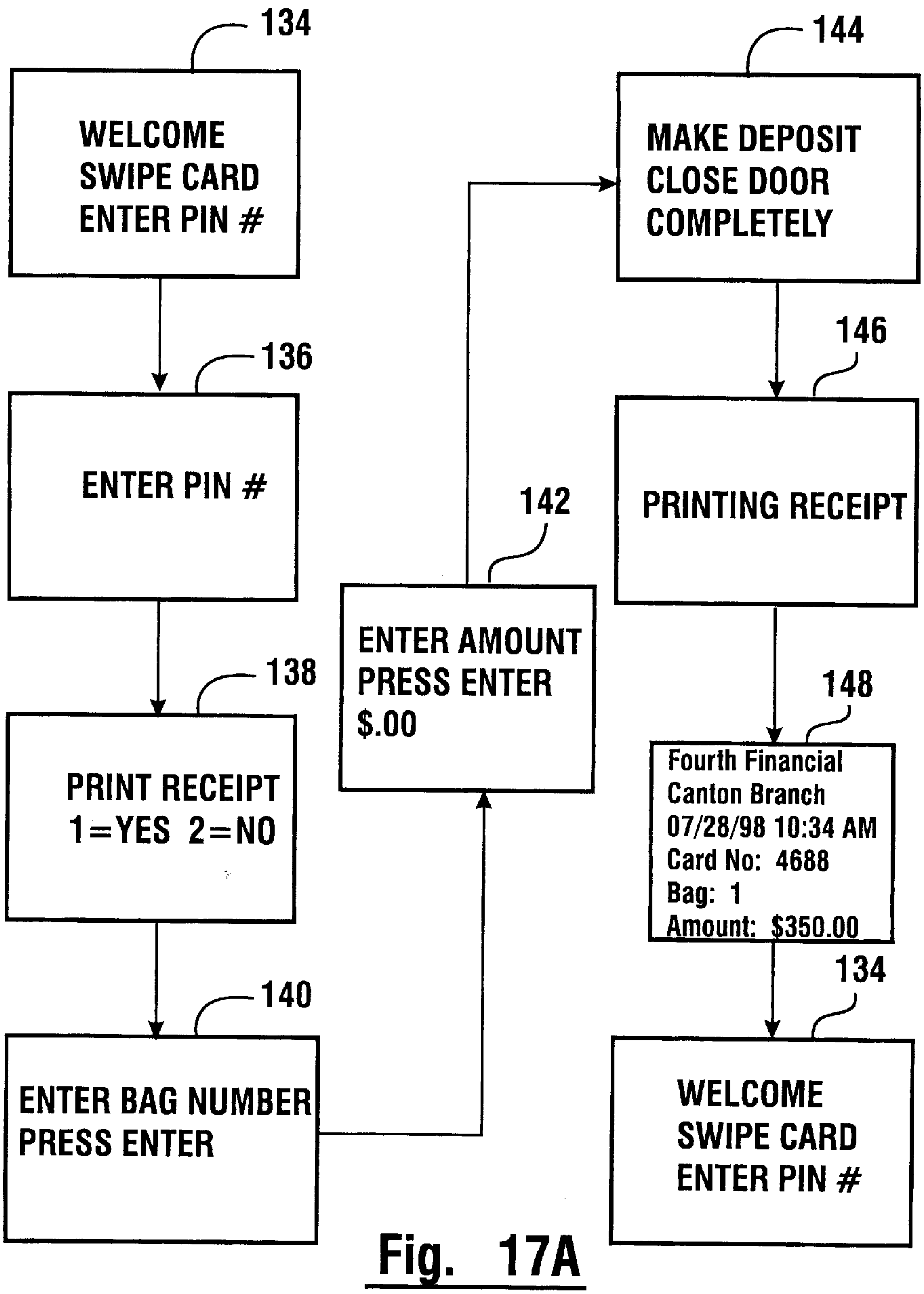
FIG. 17A is a schematic view of logic flow and exemplary screen prompts and a receipt provided to a user in operation of an exemplary secure depository used in connection with a system of the present invention.

FIG. 17A shows an exemplary transaction logic flow for operation of a depository used in connection with the system of the present invention. The data stored in the data store 72 is operative to cause the processor to output a display message schematically indicated 134 when the depository is in a wait state. Display message 134 prompts a user to swipe their card through the card reader as well as to enter a PIN number. In response to the processor sensing that a user has swiped their card through the card reader a display message 136 is displayed. Display message 136 is operative to prompt a user to enter a PIN number. In response to receipt of a user's card and PIN number the processor is operative to check the data stored in the data store 72 for purposes of determining if the user is an authorized user. If the user is authorized as indicated by the input data having a predetermined relationship to data in the data store, the logic flow proceeds. Of course if a user is not authorized the programming preferably causes an appropriate display message to be generated advising the user that the machine cannot process their transaction.

Assuming that the processor determines that the user's card and PIN is authorized, the processor is operative to present a display message 138. Display message 138 is operative to prompt the user to indicate whether they wish to have a receipt printed. The user responds to the display message 138 by inputting the appropriate message through the keypad. The user is then prompted through presentation of a display message 140 to enter the bag number or other identifying number of the deposit that they wish to input. The user does this through the keypad and then touches the appropriate "enter" function key.

In response to sensing receipt of the appropriate input in response to display message 140, the processor is operative to cause a message 142 to be displayed. Display message 142 prompts a user to input an amount associated with their deposit. In response to this message the user inputs numerical values representative of the amount into the keypad and then presses the "enter" function key.

In response to the user inputting the deposit amount the processor is operative to actuate the electrical actuator which changes the depository door from the locked to the unlocked condition and enables the depository door to be opened. The processor also is operative to cause a display message 144 to be displayed. Display message 144 prompts the user to insert the deposit and to close the depository door completely when done. Upon sensing that the depository door has been closed (and if the user has requested a receipt) the processor is operative to cause display message 146 to be presented. Display message 146 advises the user that a receipt is printing. The receipt printer in the control panel is operative to print a receipt in exemplary form which is schematically indicated 148 in FIG. 17. After printing the receipt the processor is operative to return to outputting the display message 144. Of course if the user did not input a request for a receipt the processor will cause the display message 134 to be presented immediately after the user closes the depository door in response to display message 144.

Figure 17B:
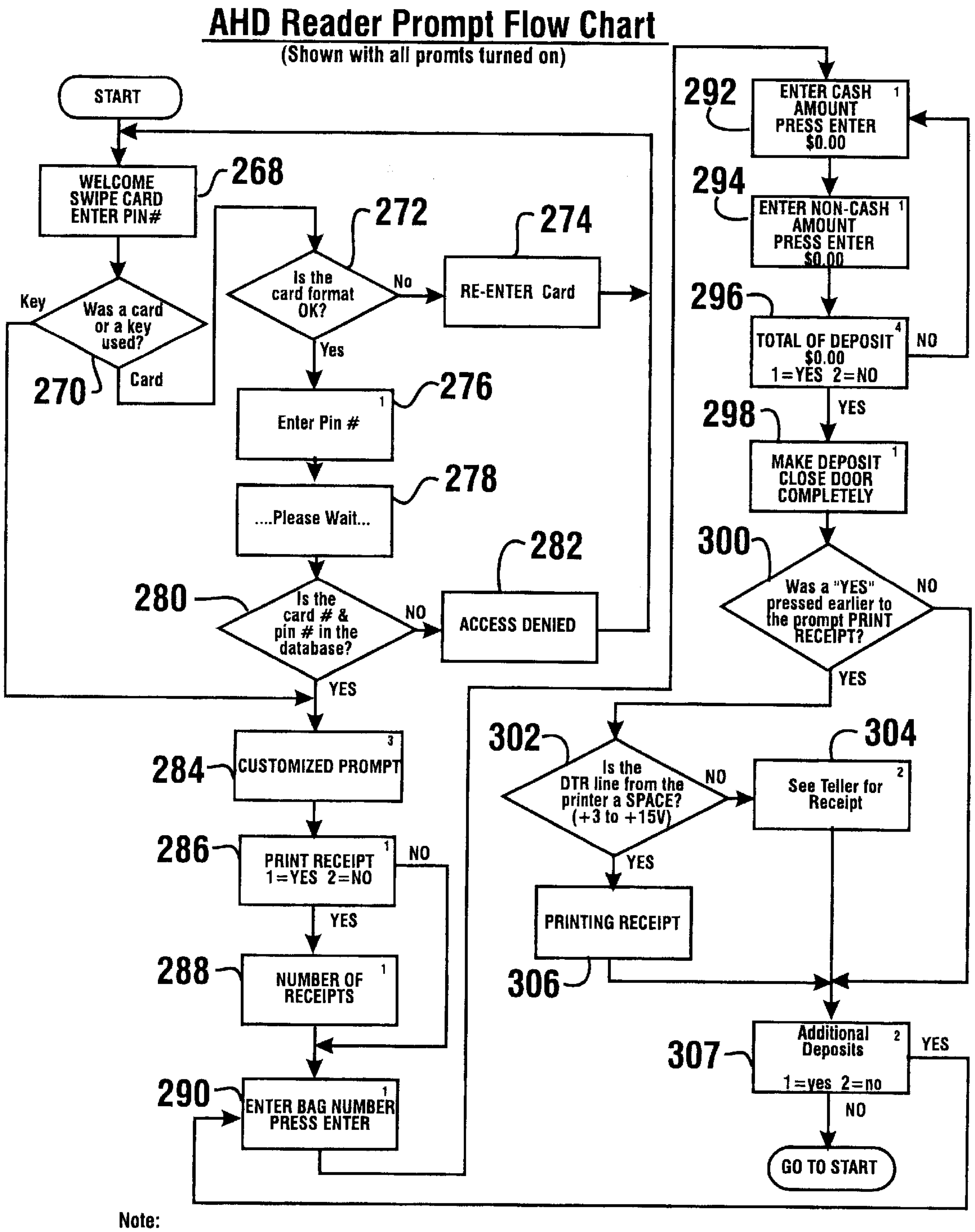
FIG. 17B is a schematic view of an alternative exemplary logic flow used in connection with an embodiment of the invention.

FIG. 17B shows an alternative logic flow used in connection with an exemplary embodiment of the invention. The transaction flow begins with the processor operating to output a display message 268 on the display. The display message is presented as the depository is in a "wait" state. At any time a user may input either a card to the card reader or a key to the key actuator or lock. Upon sensing either of these events the processor makes the determination at a step 270 of the type of input that a user has provided.

If a card is input to the card reader the processor operates in response to the stored program instructions to determine if the card data has been properly read and is in a format acceptable to the processor. This decision is made at a step 272. If the card data was not properly read or is not in a proper format the processor operates to cause a prompt message telling the customer to retry their card. This step is represented by the prompt message 274. After a brief period of time the processor returns to displaying the message 278.

If in step 272 the processor determines that the card data was properly read the processor then executes steps that cause a message 276 to be displayed. This message prompts a user to enter their PIN through the keypad. The processor receives the PIN input by the user through the keypad. After the PIN is input the processor causes a wait message 278 to be output on the display. The processor also operates to check at least a portion of the input PIN data to the card data and/or data in the data store. This is represented by a step 280. If the PIN and card data do not correspond to each other and/or the data stored in the data store, the processor operates to cause a display message 282 to be displayed. This message advises the user that access to the depository is denied. After a time the processor returns to displaying message 268.

It should be understood that in the exemplary embodiment the processor will return to displaying the initial wait state message 268 if the transaction does not proceed to a next step within a set time. For example if the user does not enter a PIN number within a time after the prompt to enter a PIN is displayed, the program times out and operates to cancel the transaction.

If the entered PIN and card data correspond to stored data, or if the user has used a key type input to access the depository, the processor operates to display a user prompt message 284. Prompt message 284 may be a customized prompt message which may be tailored to the institution operating the depository. For example, the customized prompt message may be of a promotional nature. Alternatively the customized prompt may be generated in response to stored data in connection with the particular user associated with the card and PIN data that have been input. Alternatively the message may be based on whether the user has used a card or a key to access the depository. Various approaches may be used for programming operation of the processor to provide a user with appropriate messages.

The message 284 may be displayed by the processor for a set time or may be displayed until a user provides an input, or a timeout occurs resulting in cancellation of the transaction. If the transaction proceeds the processor then operates to cause a message 286 to be displayed. Message 286 prompts a user to indicate if they wish to have a printed receipt for the deposit. If the user provides an input indicating that they want a receipt, the processor causes a message 288 to be displayed. Message 288 prompts a user to input a number of receipts that they wish to have printed by the depository. The user may input a number through the keypad representing the number of receipts they wish to have. The programming of the system preferably provides for a limit on the number of receipts that a customer may receive such as four. If the customer requests more than the maximum, only the maximum number of receipts will be printed. If at any time the user fails to provide a required input prior to a timeout the processor operates to cancel the transaction and return to displaying the initial display message 268.

Once a user has entered the number of receipts they wish to receive or if the user does not wish to receive a receipt, the processor operates to display a message 290. Message 290 prompts a user to enter a bag number or other identifying number associated with their deposit. Message 290 further prompts the user to press the "enter" key when they have completed the identifying input. In response to receiving entry of the bag identifying number and the input indicating that the number has been fully input, the processor next operates to cause a message 292 to be displayed. Message 292 prompts a user to provide an entry through the keypad indicative of the amount of cash included in the deposit. Message 292 also prompts the user to press the "enter" when the amount of cash has been input. In response to sensing that the user has provided these inputs the processor then operates to cause a message 294 to be displayed. Message 294 prompts a user to enter the non-cash amount of the deposit that is being provided and then to press the "enter" key. Non-cash amounts associated with the deposit may include items such as checks, credit card slips, travelers checks, vouchers or other items. It should be understood that in other embodiments separate prompt messages may be provided for each type of cash or non-cash type items that may be included in the deposit. In this way the depository system builds a detailed record as to the content of the user's deposit. It also enables the depository to provide a user with a receipt concerning what has been input. Of course if at any time during execution of steps 290, 292 or 294 a user fails to proceed to the next step, the processor operates to cancel the transaction after a timeout.

After sensing the input of the non-cash amount in response to message 294 the processor operates to display a message 296 on the display. Message 296 prompts a user by showing the total amount of the deposit being made responsive to the amount data that the user has entered. The message 296 is displayed for a period of time and prompts a user to indicate through an input to the keypad whether the total amount of the deposit is correct. If the user provides an input indicating that the amount of the deposit is not correct the processor operates in response to this input to return to displaying the message 292 so that the user may re-input the amounts of cash and non-cash items included in the deposit. Alternatively if the user indicates that the total amount is correct the processor proceeds with the transaction flow in accordance with its programming. In the exemplary embodiment the processor is also programmed to assume that the total displayed is correct if the user does not provide an input indicating that it is incorrect within a set period of time.

If the total amount of the deposit displayed in message 296 is considered correct either as a result of the user providing an input to that effect or as a result of a timeout, the processor operates to cause a message 298 to be output through the display. Simultaneously the processor operates to enable the user to open the depository door so that the deposit may be input to the machine. Message 298 instructs the user to make the deposit and to close the door completely. The processor through the appropriate sensors senses that the user has either opened and then closed the door or otherwise has input the deposit to the depository. The processor and other circuitry then operates to cause the depository drum to rotate such that the deposit may be moved securely into the interior area of the depository. During this time other additional steps may be executed such as the capture of images of the user and the deposited items in a manner that is later discussed.

The exemplary embodiment of the invention includes a timeout feature in connection with the making of the deposit. For example when the logic flow has reached the point where the depository is enabled to receive the deposit and the message 298 is being displayed but thereafter a deposit is not sensed as being input within a period of time, the processor operates to cancel the transaction, re-secure the depository and return to displaying the message 268. Of course it should be understood that additional steps may be provided to the user before canceling the transaction such as displaying additional prompts or giving the user the option to request additional time. The user of the system may provide more appropriate additional steps of this type through the programming associated with the processor.

In response to the processor sensing the inputs indicating that the user has made the deposit, a determination is then made at a step 300 concerning whether a receipt is to be printed. The determination on whether to print the receipts and the number of receipts to be printed is made by the processor based on its programming and the inputs of the customer provided in response to messages 286 and 288. If the receipts have been requested to be printed the processor then executes a step 302. Step 302 is executed by the processor to make a determination whether any of the sensors associated with the printer indicate a problem which renders the printer inoperative. For example if the printer is out of paper, if the associated ribbon is exhausted or another type of malfunction has occurred, this is sensed by the processor. Because a receipt cannot be printed in these circumstances, the processor operates to output a display message 304. Message 304 advises the customer that they will need to see a live teller in order to obtain their receipt. As the processor and data store associated with the present invention are operatively connected in the exemplary embodiment to other systems, personnel of the institution operating the depository may provide the user with the appropriate receipt by accessing the data store associated with the system.

If in step 302 the receipt printer is operating, the processor then operates to cause the printing of the number of receipts as requested by the customer. In the exemplary embodiment the processor also operates while the printer is printing the receipts to display a message 306. Message 306 advises the customer through the display that the receipts are being printed. The customer may then remove these receipts from the control panel as they are produced.

After printing the receipts, the processor operates to cause a message 307 to be displayed. Message 307 provides a prompt to a customer to indicate if they have additional deposits to be made into the depository. In response to the user providing an indication through an input to the keypad that they have additional deposits, the processor then operates to return in the logic flow to the point where message 290 is displayed. The user is then enabled to enter the data associated with the additional deposits. If however the user indicates that they do not have additional deposits or if a timeout occurs, then the processor operates in accordance with its logic flow to return to the start point for accepting another deposit. The processor then displays message 268 waiting for an input from another user.

In the exemplary embodiment the processor may operate to provide a detailed transaction record of the deposits that are made. Such a transaction record may include for example information concerning the bank name as well as the branch name or other designator for the depository where the deposit has been made. The transaction record may also include the date and time of making the transaction. The customer number associated with the card input or other customer identifying data may be included in the transaction receipt. The bag number which was input by the customer in response to message 290 may also be included as part of the transaction record.

Transaction receipts used in connection with embodiments of the invention may also include in the receipt the cash amounts and non-cash amounts that the user has input. The noncash amounts may also include amounts indicated for checks, credit slips, travelers checks, vouchers or other items that the user was required to input through the programming of the processor. A total deposit amount indicative of the total associated with the amounts input by the customer may also be included in the transaction receipt. This amount in the exemplary embodiment will correspond to the amount output in message 296.

Transaction records output by the machine may also include additional information related to the transaction. For example if multiple transaction receipts were printed each transaction receipt may indicate how many transaction receipts were printed and/or the particular number of the transaction receipt. For example a transaction receipt may indicate that it is number two of four that were printed. In this way when the user turns in the transaction receipt to the appropriate authorities they will able to route the appropriate copies. Transaction records may also include other information that is customized to the user or to the institution operating the machine. Commonly the institution will wish to indicate on the transaction record that the deposit is subject to verification. There also may be references to the time period that must elapse before the deposited finds may be accessed by the account holder. Other information that is customized to the institution or to the particular user may be provided on the transaction record that is output by embodiments of the present invention.

In the exemplary embodiment the processor operates to cause the image recording device to capture images of the user and the item deposited. This provides a recoverable visual record of the transaction. The processor preferably causes images to be captured responsive to at least one input of the user to the depository. Images may be captured during the transaction either periodically or continuously depending on the program instructions in the data store. In the exemplary embodiment the processor is operative to capture with the recording device at least one image of the user and the item deposited. This image is preferably captured simultaneously in a "split screen" type image or frame.

In the preferred embodiment the depository includes at least one sensor which is operative to sense the open or closed status of the depository door. The sensor is in operative connection with the processor. In the transaction sequence of the exemplary embodiment after the depository door is unlocked, the sensor senses when the depository door is opened. The closing of the door operates in accordance with programmed instructions to cause rotation of the depository drum 48. The drum turns through generally 180° to cause the deposited item to move into the interior area of the chest. During this time in the exemplary embodiment, the processor causes images of both the user and the item passing into the depository to be captured in the image recording device. In this way there is a visual record of the user and what was deposited.

It will be appreciated that the logic flow described herein is exemplary. In other embodiments the programming associated with the machine may provide different logic flows, capture images at different times or in different sequences and require different combinations of inputs for accessing the machine. It should also be understood that while a single processor and data store is shown in the exemplary embodiment, other embodiments of the invention may use multiple processing devices and data stores. This may include processors and data stores positioned at remote locations from the depository itself. Those skilled in the art may use the teachings of the described embodiment to produce various embodiments of the present invention.

In the exemplary embodiment of the system of the present invention, the secure depositories are programmed and/or operated from a remote computer. The remote computer is operative in some embodiments to download data and instructions into the data store 72. The data is stored therein concerning the inputs through the input devices that will cause the depository to operate. This will include for example card numbers, PIN numbers, bag numbers, keys or other inputs that will enable a user to input items into the depository. The computer is also operative to download into the data store data and other programmed instructions for purposes of determining the logic flow which the processor will execute. This includes for example the output messages, the data a user is required to input the format and content of transaction receipts and the options that a user is provided. The remote computer in the exemplary embodiment is also operative to include in the data store programmed instructions which determine the data that will be stored concerning transactions and how that data will be recovered.

In alternative forms of the invention the secure depositories may be operated online from a remote computer. In such alternative embodiments the stored data for controlling operation of the depository may reside in whole or in part at the remote computer. The depository may be operated in response to commands which are sent to the devices in the depository from the remote computer. Alternatively, certain data may reside in a computer at the depository and other data may reside at the remote computer. The particular configuration will depend on the particular system in which the depository is used.

In alternative embodiments the depository may be connected to a transaction network such as an ATM network. Such a network may include many automated transaction machines. In these circumstances the processor in the depository operates to generate transaction messages similar to those produced by an ATM when accepting a deposit. In the United States a common form of ATM transaction message is a 91x message developed by Diebold, Incorporated the Assignee of the present invention. In other countries a common message format is an IBM 473X message format. Such messages commonly include data representative of an account number and PIN number, the nature of the account transaction requested, the account involved and the amount. A request message is transmitted to a remote host computer. Based on the account number and stored data, the remote computer determines if the requested transaction is authorized. A response message returned by the host computer includes an indication of whether the transaction is authorized and should proceed. If the transaction is authorized, the transaction devices on the ATM operate in response thereto to perform the requested functions. If the transaction is not authorized the customer is usually informed that their transaction will not be processed. When a transaction is authorized the ATM sends a completion message to the host which indicates whether it was successfully able to carry out the requested transaction. For example, the completion message may then be used by the remote host computer to cause the customer's account to be debited in the case of a cash withdrawal, or to take other action if appropriate. Generally in the case of deposits, a customer's account is not credited for a period of time after the deposit is made so that the operator of the ATM may verify that the amount indicated was actually deposited.

In the case of a secure depository of embodiments of the present invention, the data stored in a data store may operate to have the processor generate the appropriate transaction messages. As previously explained, in the exemplary embodiment the control panel receives the customer's card data as well as a PIN number. The customer also inputs an amount. The exemplary depository will always operate to accept deposits and will conduct no other transactions. As a result the information necessary to generate an ATM request message is available from memory in the depository or is available from customer inputs at the depository.

An ATM transaction message usually must include account data. This data may be obtained by configuring information in the data store to output an additional messages in the logic flow which requests the user to select either their checking or savings account by providing an input. Alternatively the account designation information may be included in the data on a user's card. This may be included for example on one of the magnetic stripe tracks on the card, which data is read as the card is passed through the card reader. This may be particularly appropriate where the card used to access the depository is used by an employee of the account holder who has no discretion as to where deposits will be applied. Alternatively the account selection may be set within the programming in the data store by default, such as to always credit a deposit to the user's checking account. Of course alternative approaches may be taken, including programming the system so that it first looks for an account selection indicator in the card data and if no such data is present, then presenting the user with options as to which account to apply the deposit. Alternatively the data store may be configured to selectively apply deposits from various users or the businesses that they represent to selected accounts. In this way the person making the deposit is not required to make these decisions. Of course various approaches and configurations are possible depending on the needs of the system users and the operator of the depository system.

Once the data necessary to formulate an ATM request message has been input through the user input devices or recovered from the data store, the processor may operate in accordance with its programming and stored configuration data to generate the request message and deliver it into an ATM network. Provided that the input data corresponds to an authorized account, the host computer in the ATM network will return a response message which includes indicia indicative that the transaction may go forward. In response to this response message the processor may execute instructions in accordance with its programming to enable the depository door to be opened. Appropriate sensors are preferably provided in connection with the drum to sense the insertion of a deposited item. These may be for example photo sensors which sense the area underlying the depository door for the insertion of an item therein. Alternatively other types of sensors adjacent to the drum, depository door or the chest may be used to sense the insertion or passage of the deposited item. In response to sensing the insertion of an item, closing the depository door and/or rotation of the drum, the processor generates a completion message to the host indicating that it was successful in carrying out the requested transaction.

Of course if the response message from the ATM host indicates the transaction is not authorized, the processor and the secure depository will operate in accordance with programmed instructions in the data store to generate an appropriate message to the user advising them that their transaction cannot be processed. Similarly if the secure depository is not able to carry out the transaction, then the completion message to the ATM host will so indicate. This may occur for example if the depository is full and cannot accept additional deposits.

This capability to integrate secure depositories into ATM transaction or other networks facilitates use of the depository system by consumers and businesses. As with ATMs the depository may also be readily connected either continuously to a host through the ATM network or intermittently via dial-up connection, wireless connection or other suitable means of placing the depository in operative connection with the ATM network. In addition the configurable nature of the described embodiment enables the secure depository to selectively connect to various remote computers. This may include for example connecting to an ATM network for certain transactions based on the configuration stored at the depository. For other transactions the processor may operate to connect to a different computer not associated with an ATM network. Finally for other transactions the depository may be configured to operate offline and to store the results for later recovery.

An advantage of the described embodiment of the invention which includes the control panel 16 is that it provides the user with a receipt(s) for the transaction such as receipt 148 shown in FIG. 17A. In the event that a deposit cannot be located when the contents of the depository are removed, then the receipt provided to the user may help to document that the deposit was made. In addition the visual images stored by the preferred embodiment may further be recovered and used to verify that the user presented a deposit which was accepted into the machine. This may help to resolve disputes as to whether deposits were made and help to assess responsibility for any loss or misappropriation.

Of course a printed receipt is only one example of a receipt that may be provided to a user to help verify that they input a deposit. In alternative embodiments other receipt indicia may be provided. This may include for example providing indicia that is encoded on the user's card to indicate that the deposit was made. Alternatively a user may be provided with a so-called "smart card" which includes a programmable memory thereon. Including a device in the control panel which enables reading and writing on such a programmable memory enables storing data representative of deposits in the memory of the smart card in a secure manner and which cannot be readily tampered with. Such other forms of receipts present the advantage that the user will be provided with documentation concerning their deposit even if no paper is present in the machine. In addition or in the alternative the cameras which provide images of the user and the deposited item may also be connected with a digitizer in the manner of the incorporated patent application disclosure. This enables image data as well as transaction data to be provided to the user as part of the electronic receipt data stored on a smart card. In situations in which a smart card does not have sufficient memory to hold all the data which is part of a receipt, or in circumstances where it is desired, hand held computers may receive the data through an infrared connection or similar communications port on the front of the control panel. Such communications methods will enable the user to obtain an electronic receipt more fully documenting their activities to minimize the risk of disputes later. Of course other approaches may be used depending on the requirements of the system operator.

Figure 12:
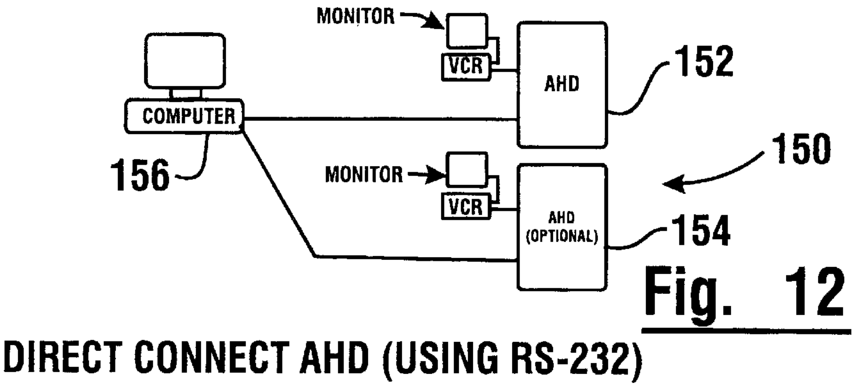
FIG. 12 is a schematic view of a first exemplary system configuration of the present invention including secure depositories and a remote computer.

FIGS. 12 through 16 are schematic views of various systems configurations which may be used in connection with the present invention. FIG. 12 shows a first system generally indicated 150. System 150 shows two secure depositories 152 and 154. Each depository is shown in operative connection with a recording device for capturing video images. A remote computer 156 is shown connected to the depositories by a line connection such as an RS232 connection. It should be understood that while in exemplary system 150 the connection is continuous the depositories may run in essentially an offline mode except when receiving configuration data or delivering transaction data to the computer. Alternatively the computer may be configured so as to run each of the depositories in an online mode.

Figure 13:
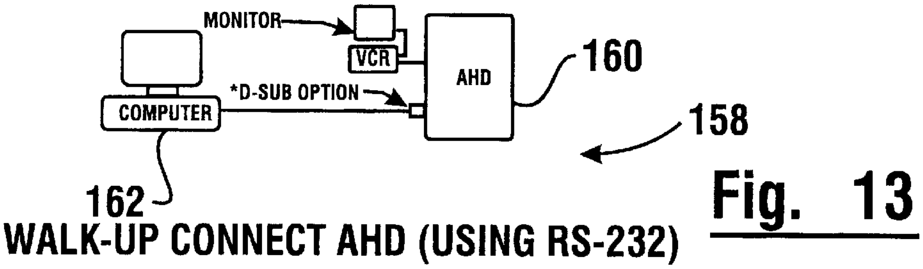
FIG. 13 is an alternative configuration of a secure depository system of the present invention.

FIG. 13 shows an alternative system 158. System 158 includes a depository 160. In system 158 a computer 162 is preferably a laptop or hand held computer. The computer includes a releasible connection to a data port on the depository which enables it to connect to the processor and the data store. As a result in exemplary system 158 the depository always runs in an offline mode. Configuration data is provided and transaction data recovered periodically when a service person brings the computer 162 to the depository and connects it through the releasible connector. It should further be understood that while in the exemplary embodiment the connection is a releasible physical connection, in alternative embodiments the depository may be provided with an infrared, RF, inductance or other noncontact type connector which enables the exchange of data with the computer when the computer is brought adjacent thereto.

Figure 14:
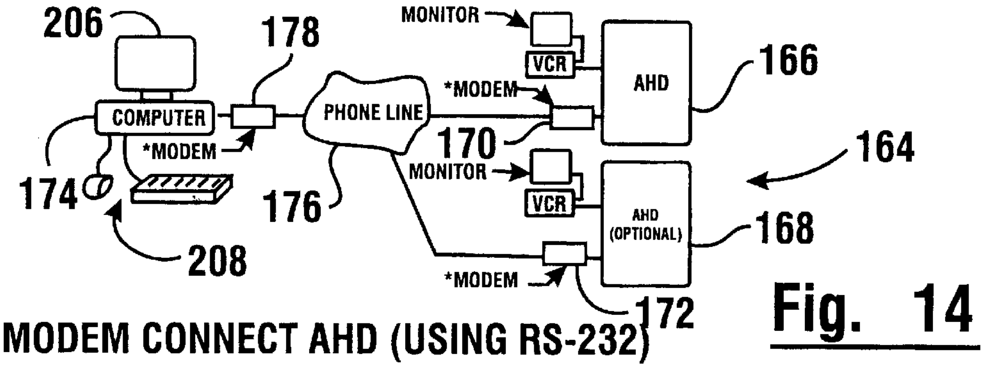
FIG. 14 is a further alternative configuration of an exemplary system of the present invention.

FIG. 14 shows yet a further alternative system generally indicated 164. System 164 includes a depository 166 and a depository 168. Depository 166 is in operative connection with a modem 170 and depository 168 is in operative connection with a modem 172. The modems connect to a remote computer 174 through a phone line, data line, wireless, cellular or other similar communications network 176. Computer 174 is in operative connection with a modem 178 which enables the computer 174 to communicate with the depositories through their respective modems. The configuration of system 164 enables depositories 166 and 168 to receive configuration data from computer 174 as well as to deliver transaction data thereto. Alternatively system 164 may operate the depositories in a dial-up type configuration where operation of each depository is controlled from the remote computer 174.

Figure 15:
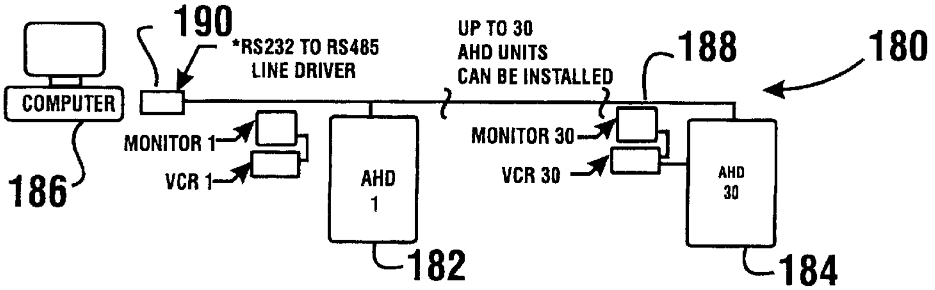
FIG. 15 is a further alternative configuration of an exemplary system of the present invention.

FIG. 15 shows yet another alternative system 180. System 180 includes a number of depositories two of which are shown, depositories 182 and 184. The depositories are connected to a remote computer 186 through a line connection 188. In the described form of the invention the line connection is an RS485 connection which enables up to 30 depository units to be operated in connection therewith. The system further includes a line driver 190 for providing the connection between the computer 186 and the line connection. In the exemplary systems configuration shown in FIG. 15 the depositories may be operated in generally an offline mode as previously discussed and may exchange data with the computer 186 only when receiving configuration data or delivering transaction data. Alternatively the depositories may operate online responsive to instructions delivered during transactions from the remote computer 186.

Figure 16:
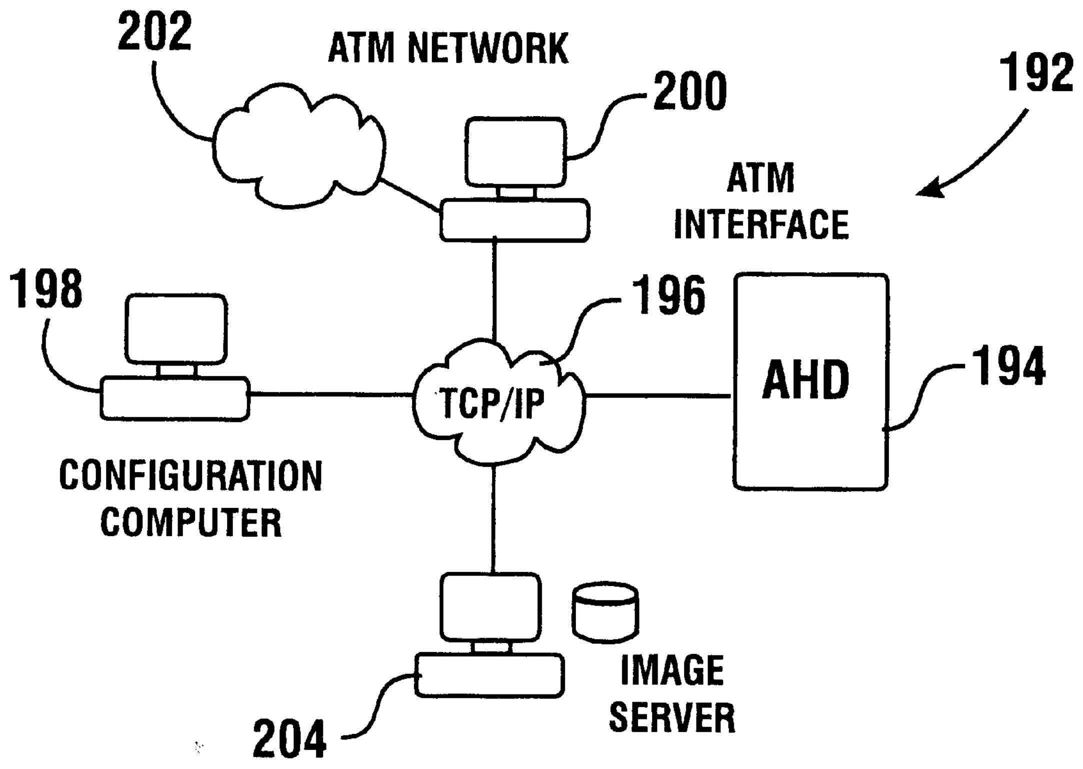
FIG. 16 is a further alternative configuration of an exemplary system of the present invention.

FIG. 16 discloses yet another alternative system configuration generally indicated 192. The system includes a depository 194 of the type previously described. The depository 194 in this embodiment is programmed to operate as a server which delivers messages through a TCP/IP format. This enables the depository 194 to communicate through a TCP/IP network schematically indicated 196. Network 196 may be a local area network or a wide area network. The depository communicates through the TCP/IP network with one or more remote computers or servers. These may include for example a computer 198 which includes a configuration server for downloading configuration data to the data store in the depository and for receiving transaction information therefrom. Alternatively the depository may communicate with a computer 200 which operates as an interface to an ATM network schematically indicated 202. Computer 200 may operate as a firewall to prevent unauthorized access to TCP/IP network 196. Alternatively or in addition computer 200 may operate to generate ATM transaction messages based on messages received from the depository 194.

System 192 may include a computer 204. In embodiments of the invention where the depository employs the image capture system of the incorporated disclosure shown in U.S. patent application Ser. No. 60/103,731 filed Oct. 9, 1998, image data may be received and stored in computer 204 along with transaction data. Of course it should be understood that this configuration is exemplary and image data as well as an ATM network interface may be provided through a single computer connected to the TCP/IP network 196. As in the other systems, the depository 194 in system 192 may be operated in either an online or an offline mode depending on the configuration. Similarly the depository may operate either online or offline depending on whether it is routing transactions to ATM network 202, computer 198 or storing transaction data for later recovery.

It should be understood that the systems configurations shown in FIGS. 12-16 are exemplary and that other systems configurations may be used in embodiments of the invention. It should further be understood that systems including the configurations shown may be interconnected through intermediate servers and computers and by various networking techniques. Systems of the invention may be integrated in systems with other types of devices such as with ATMs and other types of automated banking machines. Numerous different systems configurations will be apparent to those skilled in the art from the foregoing description.

In an exemplary embodiment of the system of the present invention an operator is enabled to configure programmable instructions and other data in the data store in the control panel of the depository, through programs which operate in the remote computer. Likewise transaction data relating to transactions conducted at the machine may be recovered from the memory in the depository by the remote computer. For purposes of describing an exemplary embodiment, a system similar to system 164 shown in FIG. 14 will be described. In this system the remote computer 174 operates using a graphical interface such as that provided by Windows95™ or WindowsNT™ provided by Microsoft Corporation. The computer is in operative connection with a monitor 206 which in the described embodiment is a CRT, LCD or other similar output device. The computer 174 is also in operative connection with input devices schematically indicated 208 such as a mouse, keyboard or similar devices.

Figure 18:
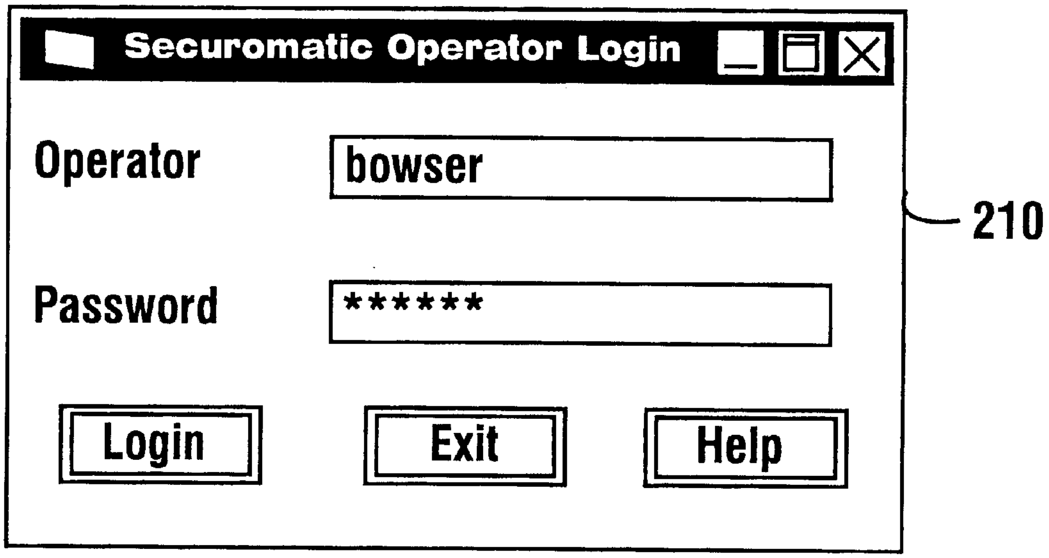
FIG. 18 is an exemplary embodiment of a log-in screen window displayed by an output device associated with a remote computer used in an exemplary system of the present invention.
Figure 19:
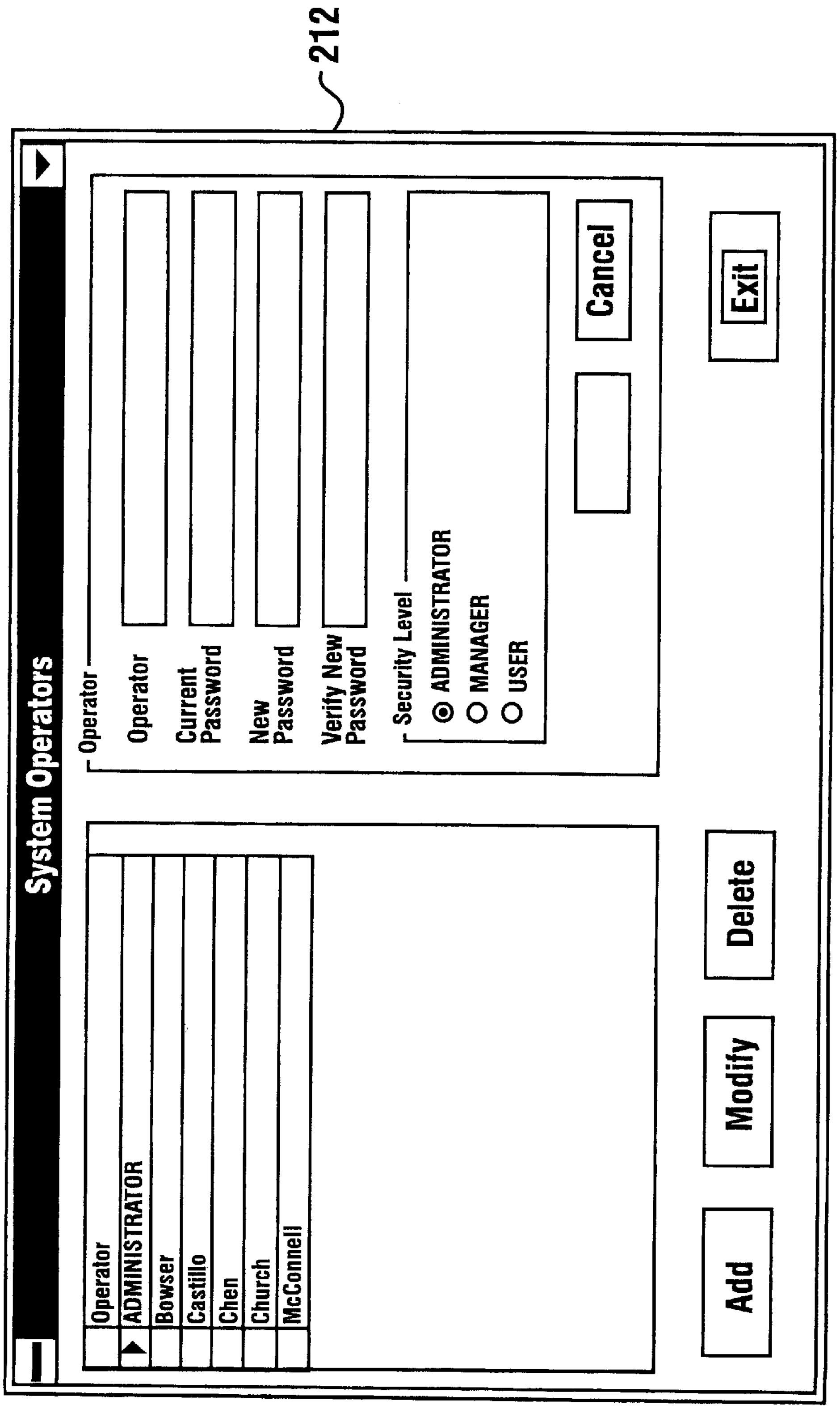
FIG. 19 is an exemplary system operator's window displayed by the output device of the remote computer.

The software operating in the computer 174 of the exemplary embodiment includes instructions for limiting access to the computer to authorized users. This reduces the risk that unauthorized persons will access the data concerning transactions. The computer is programmed to require an authorized user to input both an identifying indicator such as their last name as well as a corresponding password. This is done by a user in response to a login screen 210 which is shown in FIG. 18. If the user is an authorized user and the password corresponds to that of the authorized user, the user is provided access to the other programs which operate in the computer. In the described embodiment the authorized users are provided access to the capabilities of the computer based on their assigned security levels. Persons who have the security level of administrator are allowed to add or delete authorized users, change corresponding passwords and have access to all the capabilities of the system. Persons designated at a manager level are enabled to change configuration parameters for the system as well as to review transaction data. Persons with user status are only enabled to review data and carry out routine functions available within the system. These various levels of authorization are represented by the operator screen 212 shown in FIG. 19. The operator screen graphically demonstrates the ability of the systems administrator to establish the parameters of authorized users and to limit access to the features of the system.

Figure 20:
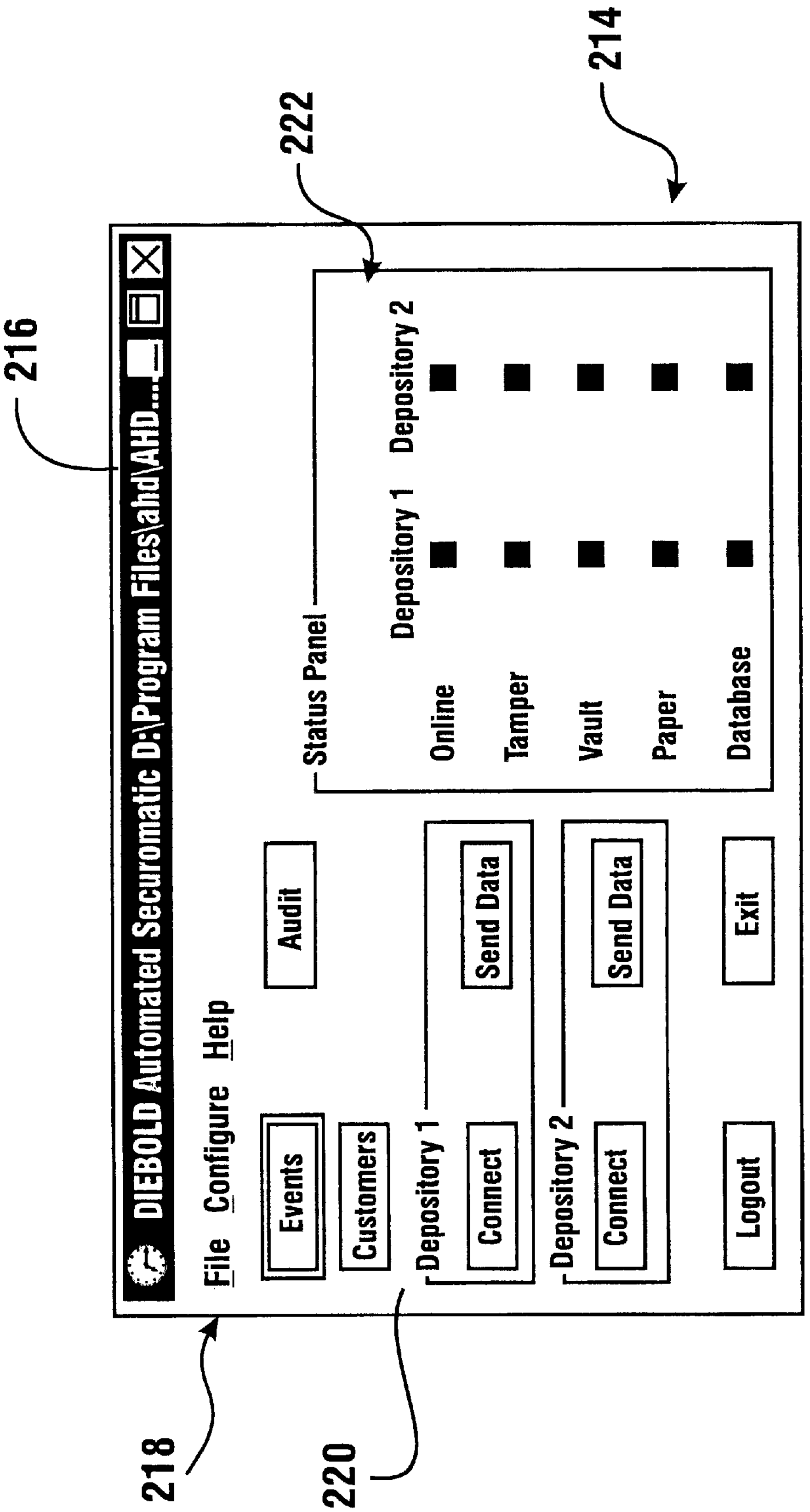
FIG. 20 is an exemplary main window displayed by the output device of the remote computer.

In the exemplary embodiment when an authorized user logs on to the system they are presented with the main window designated 214 in FIG. 20. The main window includes an indication of the database path 216 as well as a menu bar 218. Main window 214 further includes a button panel 220 and a status panel 222. Button panel 220 includes a plurality of icons or "buttons" therein. These buttons may be selected by a user to perform certain operations. The functions of the buttons in the button panel 220 are described in the table shown in FIG. 21. Selecting the buttons from the button panel enables a user to deliver configuration data to the data store associated with the card reader in the depository. A user is also enabled to retrieve transaction data stored in the data store. It should be understood that while main window 214 displays icons associated with two depositories, other embodiments may display data associated with any number of depositories.

The indicators in the status panel 222 indicate various conditions associated with the depositories. Indicators in the status panel of the exemplary embodiment operate to change color depending on status. The conditions represented by the colors of the indicators in the status panel are represented by the table shown in FIG. 22. The status indicators provide the user with an indication of status conditions as well as activities which were conducted or which may need to be conducted at each depository.

Figure 23:
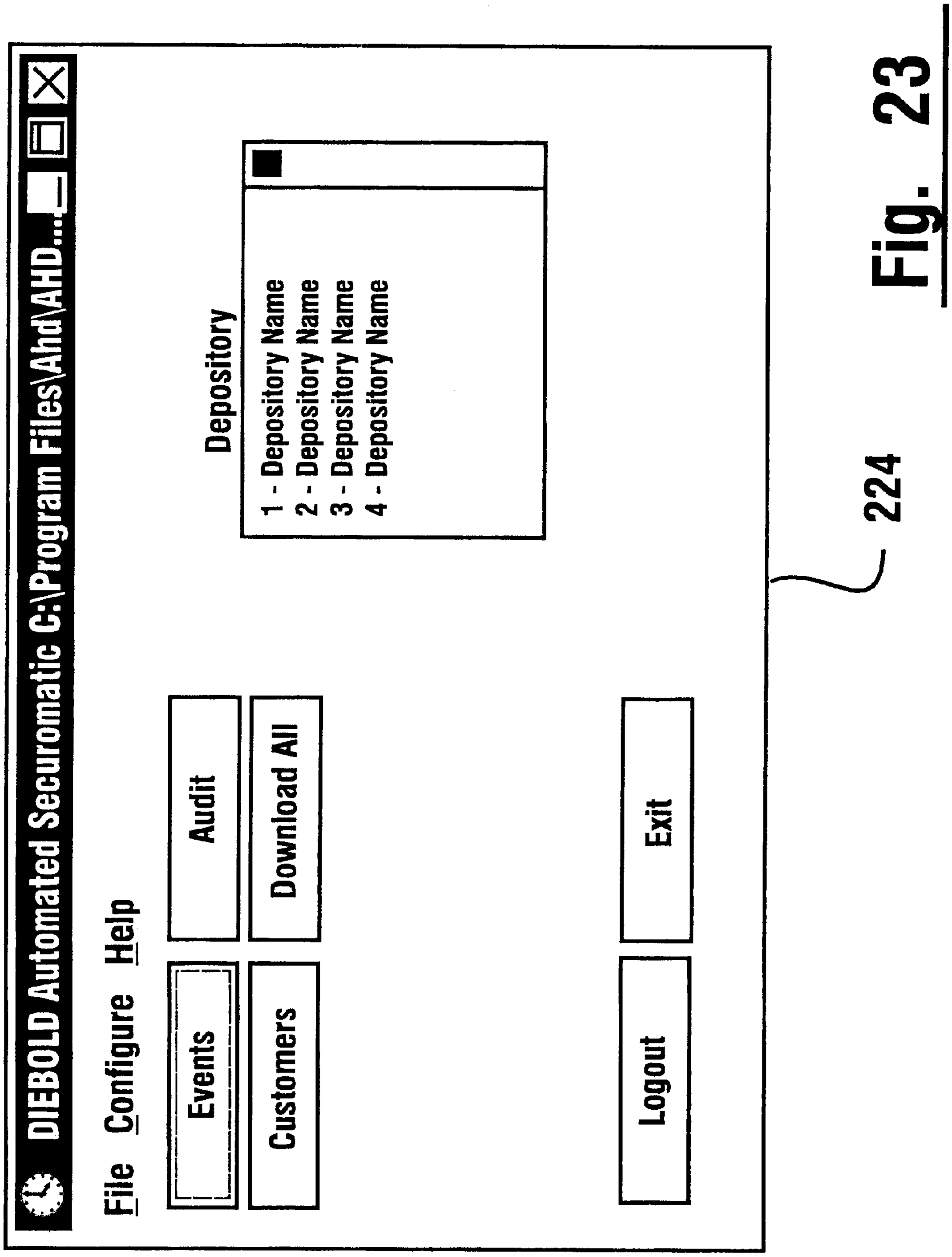
FIG. 23 is an alternative embodiment of a main window which provides an alternative to the window type shown in FIG. 20.

FIG. 23 shows an alternative form of a main window designated 224. Alternative main window 224 is designed to be used in systems which include a plurality of depositories. A configuration of main window 224 enables a user to select a particular depository and to receive information concerning events that have occurred at the depository, to update information concerning customers, to conduct audits and generally to perform the functions associated with window 214 for any one of a plurality of selected depositories. Of course windows 214 and 224 are exemplary and many other interface configurations may be used.

Figure 24:
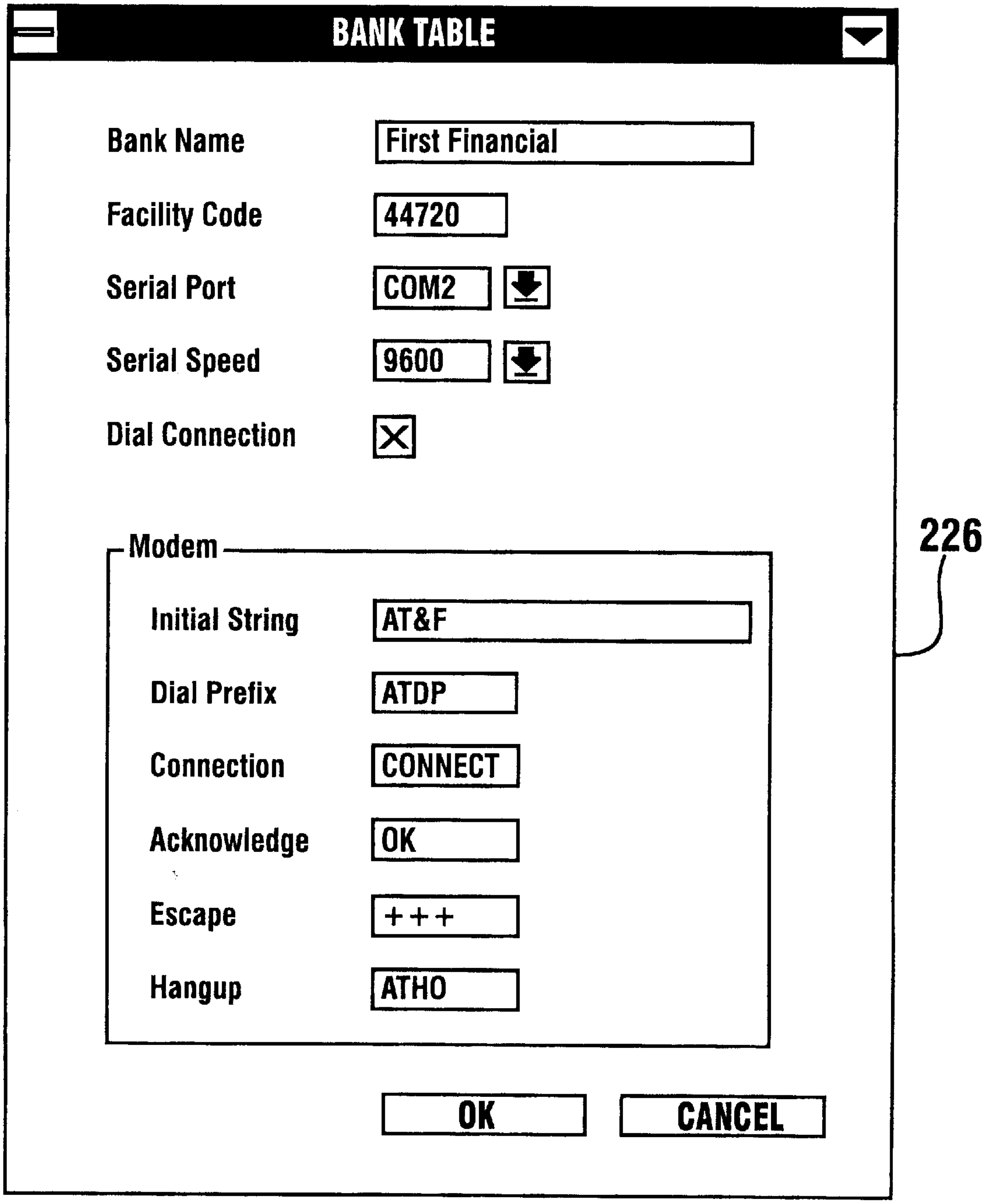
FIG. 24 is an exemplary embodiment of a window used for configuring parameters for setting up communication with a secure depository from the remote computer.

In the exemplary embodiment the system is configured by identifying the depositories and communications functions for communicating therewith. In response to a user selecting the configurations functions from the menu bar in the main window, the computer is operative to display a bank table window indicated 226 in FIG. 24. The bank table window enables the user to input the name of a bank and a facility code to designate the facility where the deposit only is located. The bank table window also enables the user to establish the communication settings for the modem or other communications device that is used to communicate with the depository.

Figure 25:
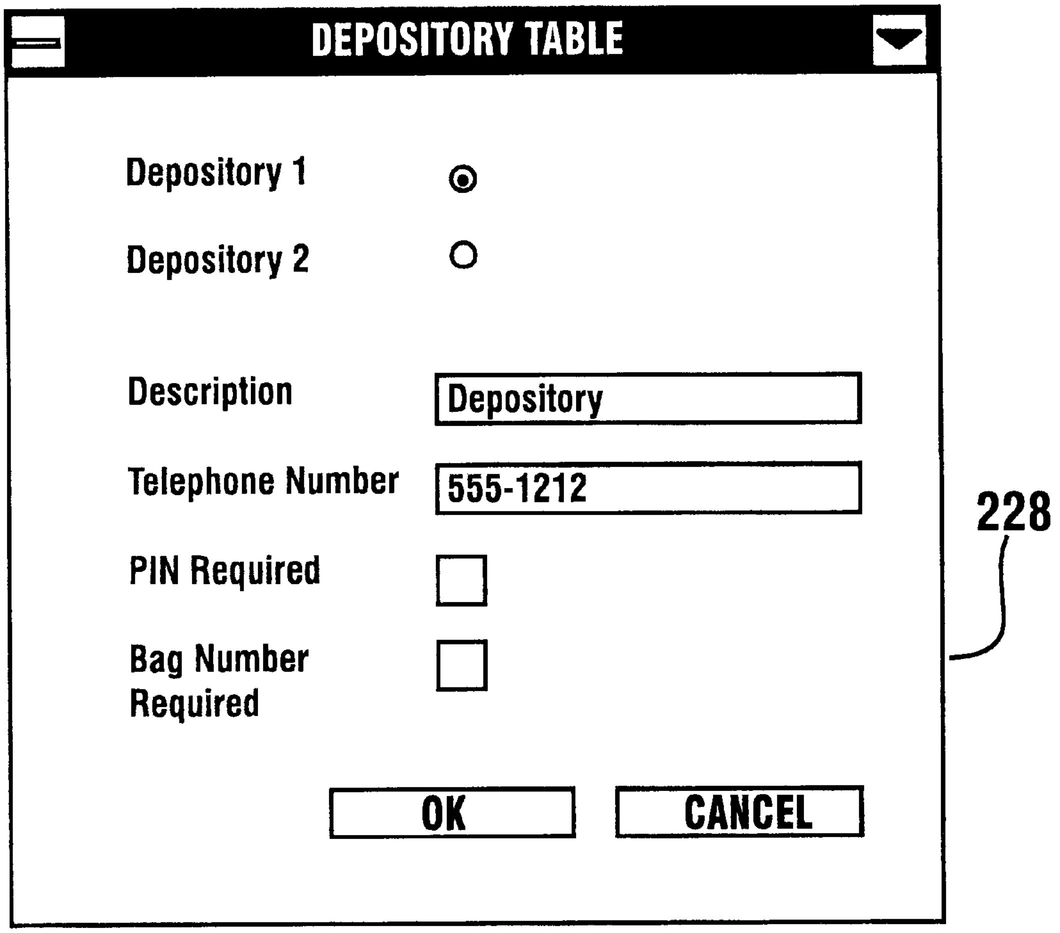
FIG. 25 is an exemplary embodiment of a depository configuration window.

A user is also enabled to configure the logic flow carried out by the depository responsive to data in the data store by displaying a depository table window indicated 228 in FIG. 25. In this exemplary embodiment the user is enabled to set the modem telephone number for the depository to achieve the dial-up connection. The user is also enabled to configure the depository concerning whether a PIN number will be required to be input by a user to access the depository. The depository table window also enables the user to establish whether the particular depository will require the user to input a bag number in order to access the depository. Of course the options that a user has for configuring the system through window 228 are exemplary and additional for other requirements may be used in connection with other embodiments.

Figure 26:
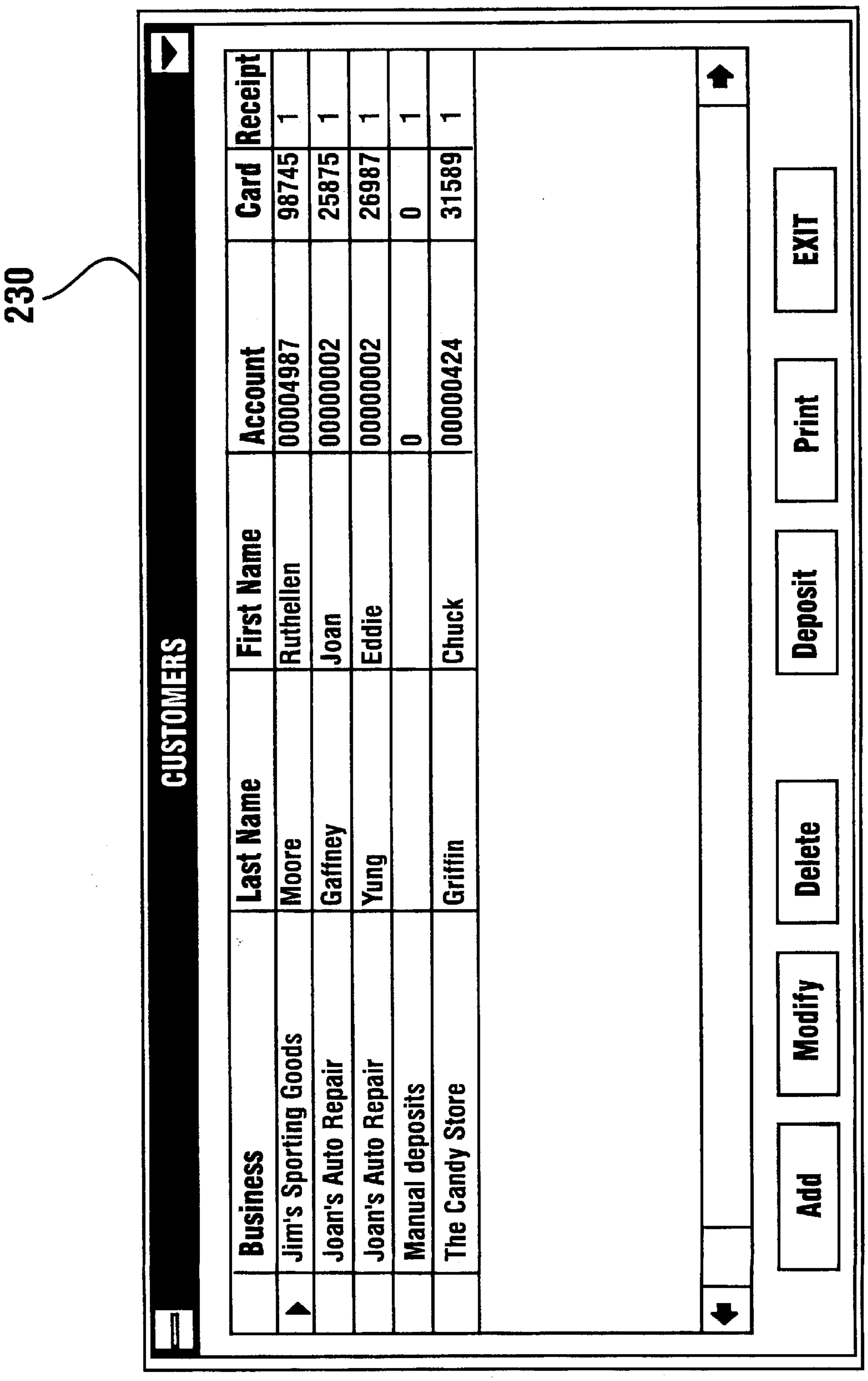
FIG. 26 is an exemplary embodiment of a customer database window including indicia representative of customers authorized to use secure depositories in the system.

In the exemplary embodiment of the system the data store associated with computer 174 includes a database of customers that are authorized to operate the system. Portions of such data are also stored in the data store at the depository so as to enable those authorized customers and persons who work on their behalf to access the depository for purposes of making deposits therein. The selection of the "customers" button from the main window 214 enables a user to display database information concerning customers that are authorized to access the depository. These are shown in a customer window 230 which is shown in FIG. 26. The customer window shows the customer name as well as individuals who are authorized to make deposits on behalf of the customer. The displayed information also includes the account number associated with the customer as well as a card number which is encoded on the magnetic stripe of the card that is used to access the depository. The database also includes an option to have more than one receipt printed for the particular customer. It should be understood that in some businesses it is desirable to have more than one receipt for a deposit. This enables the deposit receipts to be provided to more than one appropriate individual. For example the user making the deposit may wish to retain one copy of the receipt for their records to document that the deposit was made. The system of the exemplary embodiment enables establishing the number of receipts that will be printed for any given customer accessing the depository. Alternative systems as previously discussed may provide a user with a selection to determine the number of copies of receipts they will receive. In such embodiments an alternative set up window is provided through which a maximum number of receipts available to the user may be set.

It should also be noted that in customer window 230 manual deposits are authorized. Manual deposits are represented by users who utilize a key to actuate the key actuator 24 for purposes of opening the depository door. In this exemplary embodiment customers who have a proper key are enabled to place the deposits into the depository. This minimizes the need to change practices with existing customers who may still use their keys to access the depository. This feature demonstrates the flexibility of the present invention in terms of accommodating existing customers and their practices while enabling other customers to use the system in connection with magnetic stripe cards and other features to facilitate tracking of deposits. It further enables existing customers who wish to make deposits using the traditional key actuation system to do so while enabling the depository to be connected in an ATM or similar network. Of course it should be understood that embodiments of the invention may include a key actuator for accepting electronic coded keys, and the data store may be configured to provide access selectively in response to certain keys and data.

Figure 27:
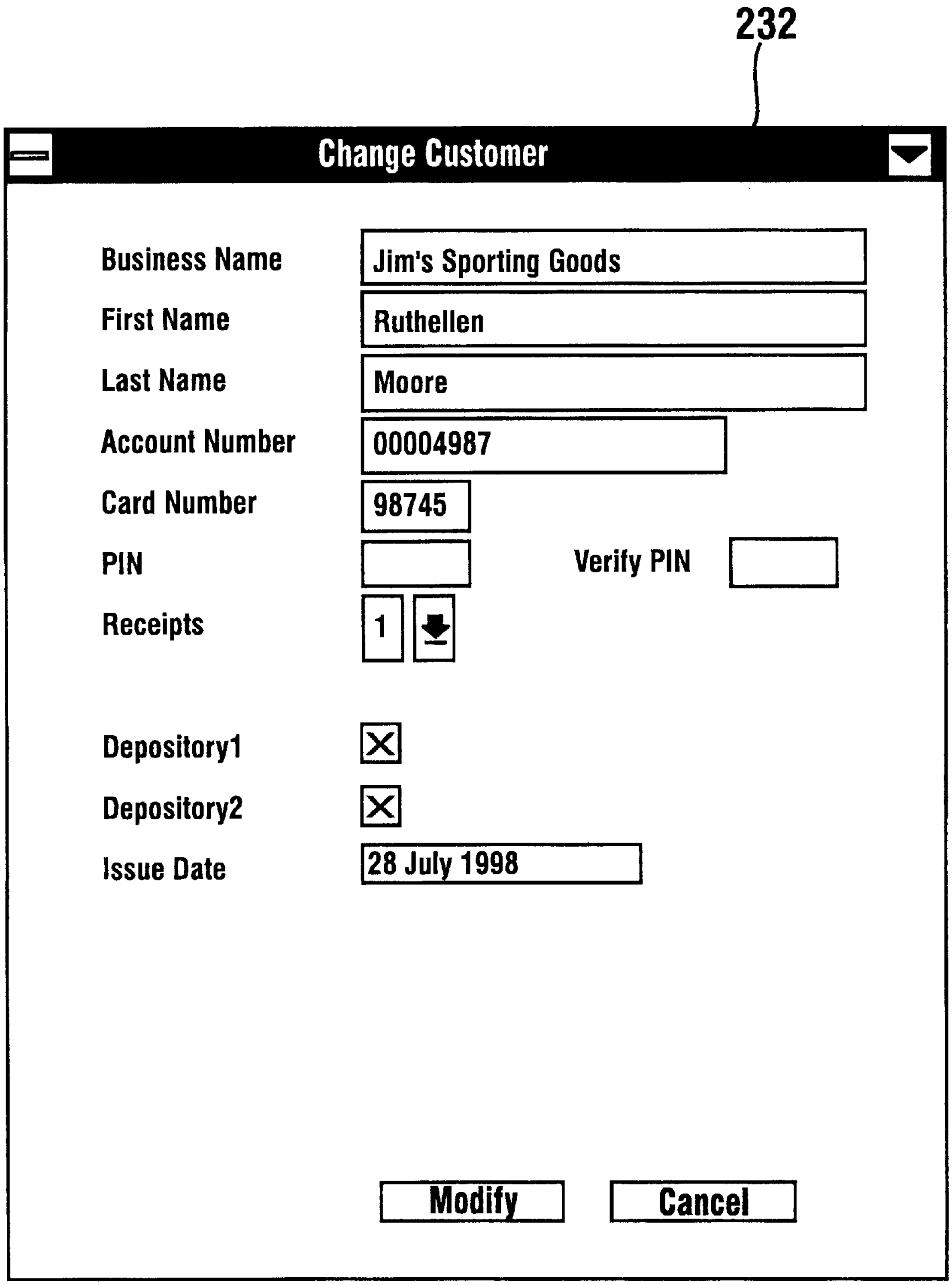
FIG. 27 is an exemplary embodiment of a customer change window used to add or change a customer record.

From the customer window 230 an operator is enabled to add and delete customers as well as to change information about customers. When an operator selects the "add" or "modify" buttons from the customer window 230, a customer information window 232 shown in FIG. 27 is displayed. In the customer information window a user is enabled to input information about new customers or to change information about existing customers. A user is also enabled to change a customer's PIN number if desired, indicate the number of receipts (if applicable) and to designate which of the connected depositories the customer is enabled to operate. In a preferred form of the invention the PIN number if used is not displayed. Rather the user setting up the system is required to input the PIN number twice to verify that it has been input correctly.

Figure 28:
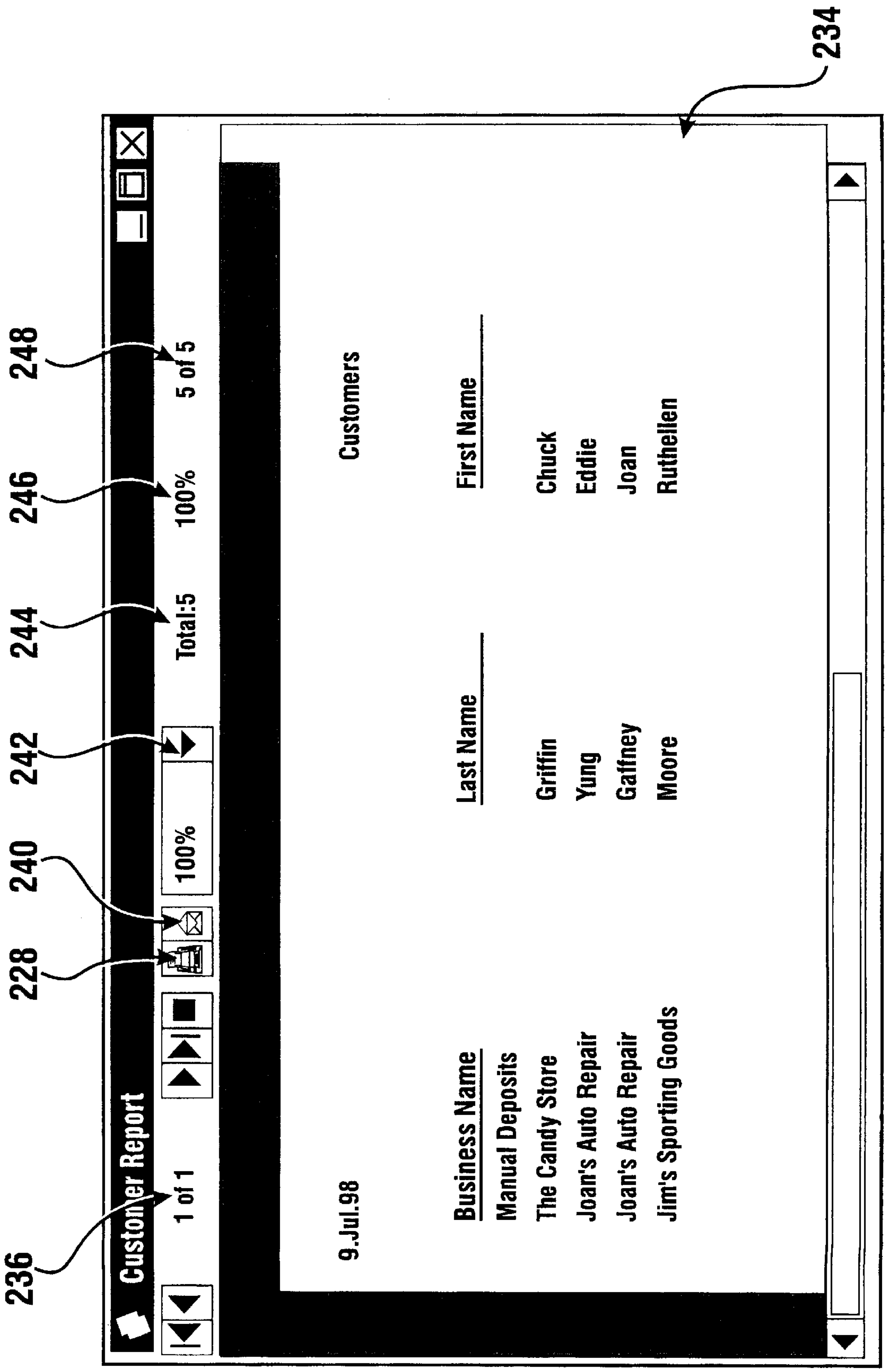
FIG. 28 is an exemplary embodiment of a customer report window.
Figure 29:
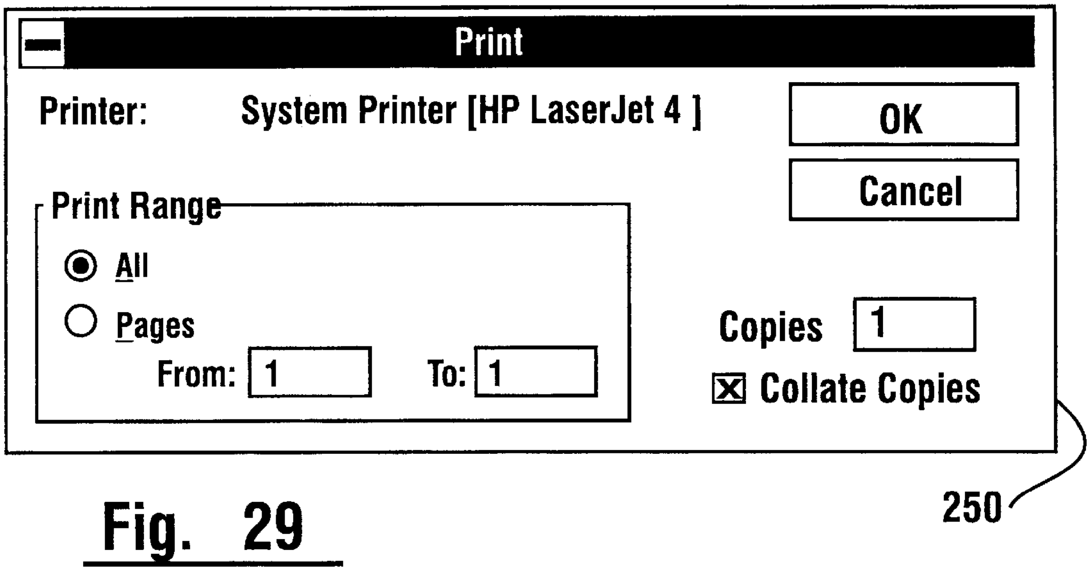
FIG. 29 is an exemplary embodiment of a print window displayed by the output device of the remote computer of the exemplary embodiment when printing information.

When the system operator at the remote computer wishes to obtain a report of transactions conducted the operator may select the "print" button from the customer window 230. Selecting the print button causes a customer report window 234 shown in FIG. 28 to be displayed. The customer report window displays a report that lists customers in alphabetical order by first and last name or other appropriate business entity name or designator. The report also displays characters and digits for fields in the customer record. The customer report window includes a page indication 236 which indicates the number of pages in the report. The window also includes "buttons" such as a print icon 238 and an export icon 240. Selection of the print icon causes the report to be printed and the export icon is operative to cause the data to be exported from the system for use in another system.

The customer report window further includes a percentage indicator 242 which indicates the percentage of the report shown on the screen. An indication of the total number of records 244 is also provided. An indicator 246 showing the percentage of the total records shown is also provided along with an indicator 248 which indicates the relative numbers of the records being displayed.

Figure 30:
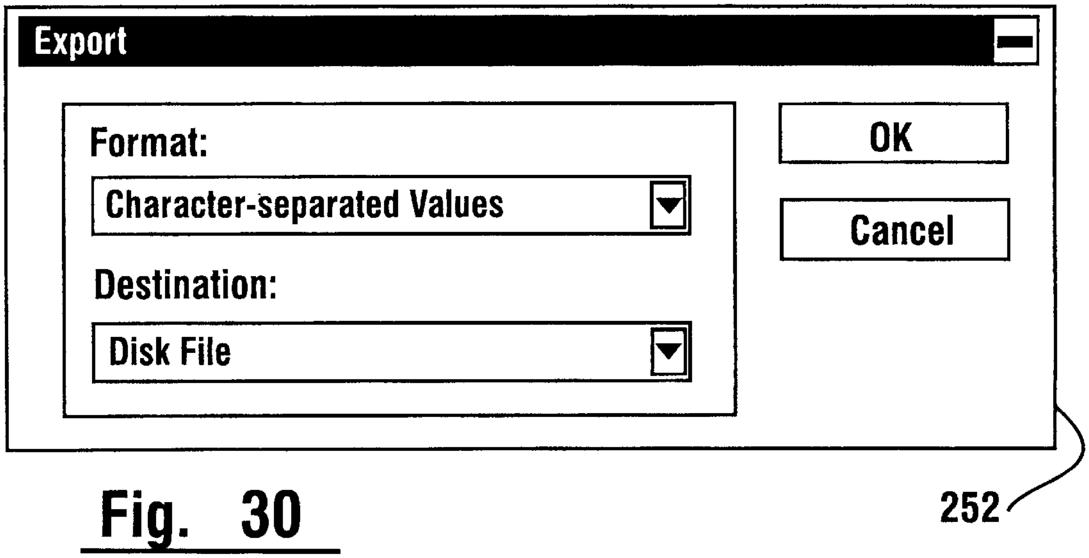
FIG. 30 is an exemplary embodiment of an export window used for exporting information concerning transactions conducted at the automated depositories from the remote computer.
Figure 31:
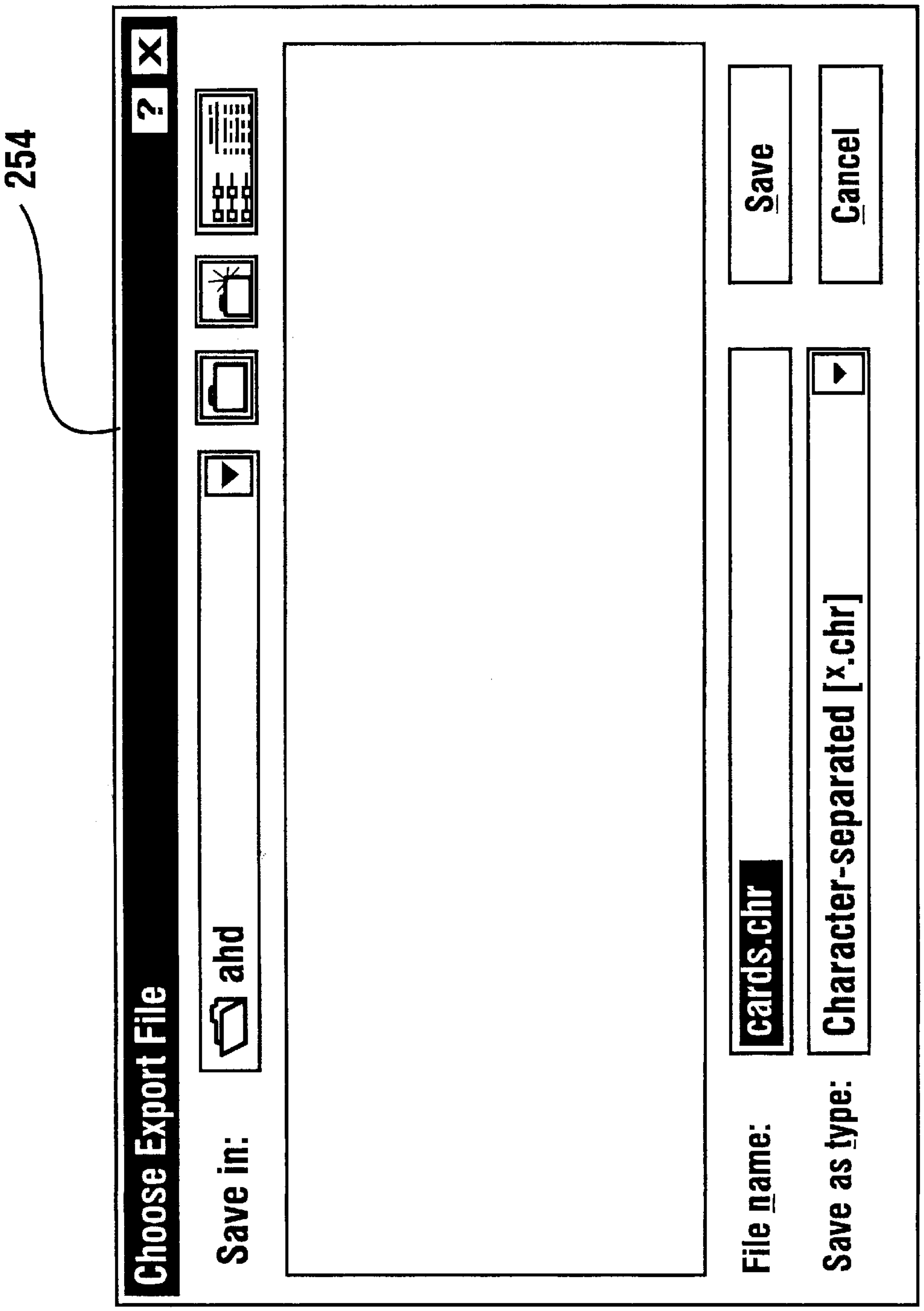
FIG. 31 is a choose export file window used for choosing file data to be exported.

Selection of the print icon 238 from the customer report window 234 causes a print window 250 to be displayed. From the print window the operator is enabled to print selected pages of the customer report. Selection of the export icon 240 causes an export window 252 shown in FIG. 30 to be displayed. In the exemplary embodiment the programming of the computer 174 enables the export of the data to be made in selected formats with character separation values. The operator is enabled to select the character separation values to separate the data fields in the data to be exported. The operator is further enabled to select the designator for the exported data such as a file name on disk. When the data is exported this is represented by a choose export file window designated 254 and shown in FIG. 31.

Figure 32:
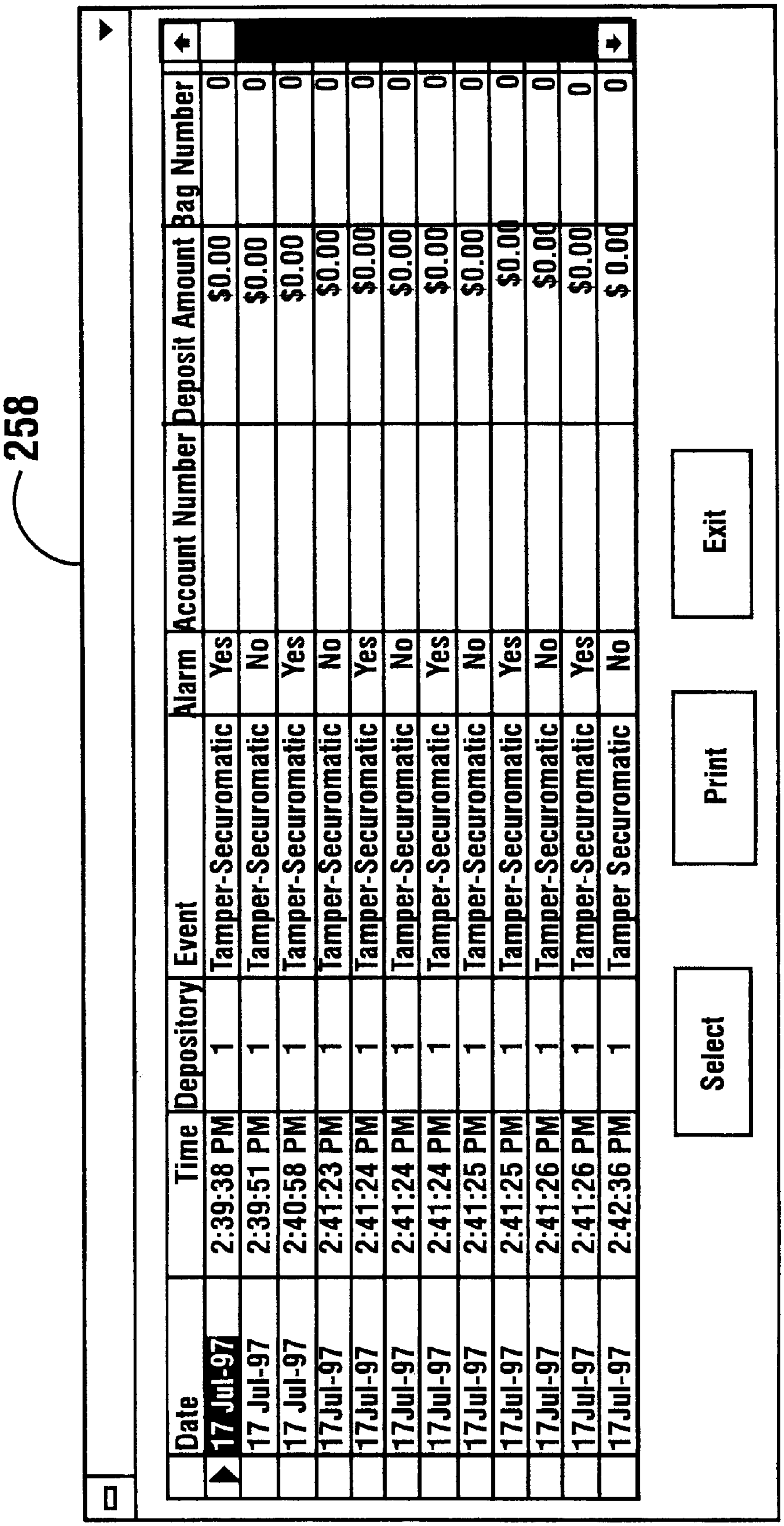
FIG. 32 is an example of an event window associated with events that do not correspond to any particular customer and which are sensed as occurring at secure depositories.
Figure 33:
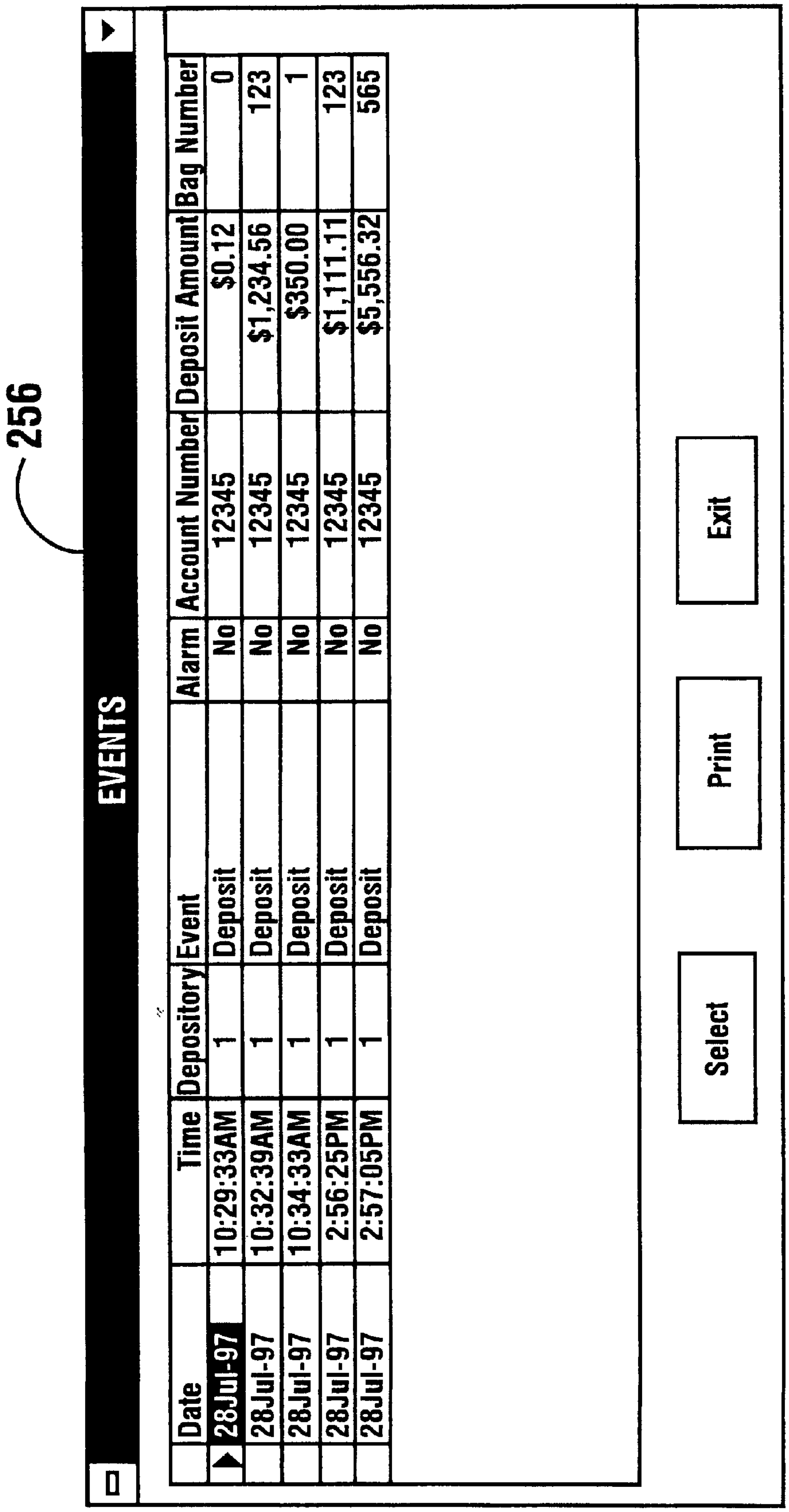
FIG. 33 is an exemplary embodiment of an events window associated with a particular account number.
Figure 34:
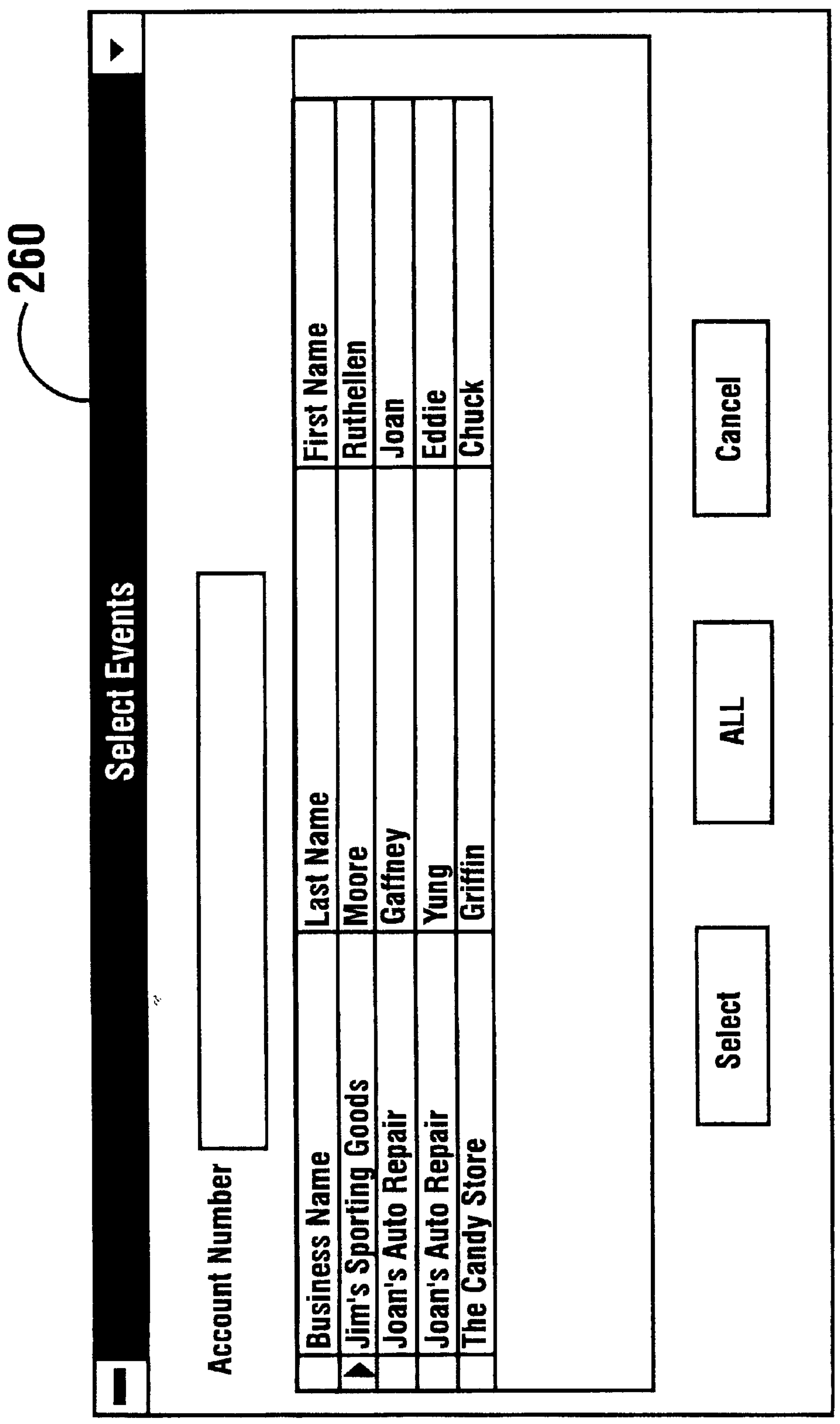
FIG. 34 is a select events window which is used by an operator of the remote computer to select a particular customer for purposes of reviewing transaction events associated with that customer.

The operator of the system is also enabled to review deposits made by any particular customer into the depositories. This is accomplished from the customer window 230 by selecting the "deposits" button. This causes a customer events window indicated 256 and shown in FIG. 33, to be displayed. The customer events window of the exemplary embodiment includes information concerning each deposit made by the selected customer. Alternatively an operator of the system may review all of the events that have occurred at a depository. This is accomplished from the main window 214 shown in FIG. 20 and selecting the "events" button. Selection of the "events" button causes a listing of all events to be displayed. This is represented by an events window 258 shown in FIG. 32. From the events window 258 an operator is enabled to select events of interest. Some events as indicated by the events window 258 may indicate alarm conditions and other conditions associated with operation of the depository. Other events are indicative of deposits. By selecting the "select" button from the events window 258 the user is enabled to display a listing of customers that have conducted transactions. This is represented by a select events window 260 shown in FIG. 34. From the select events window the operator is enabled to select a particular customer and to display depository events for that selected customer through the display of the customer events window 250.

Figure 35:
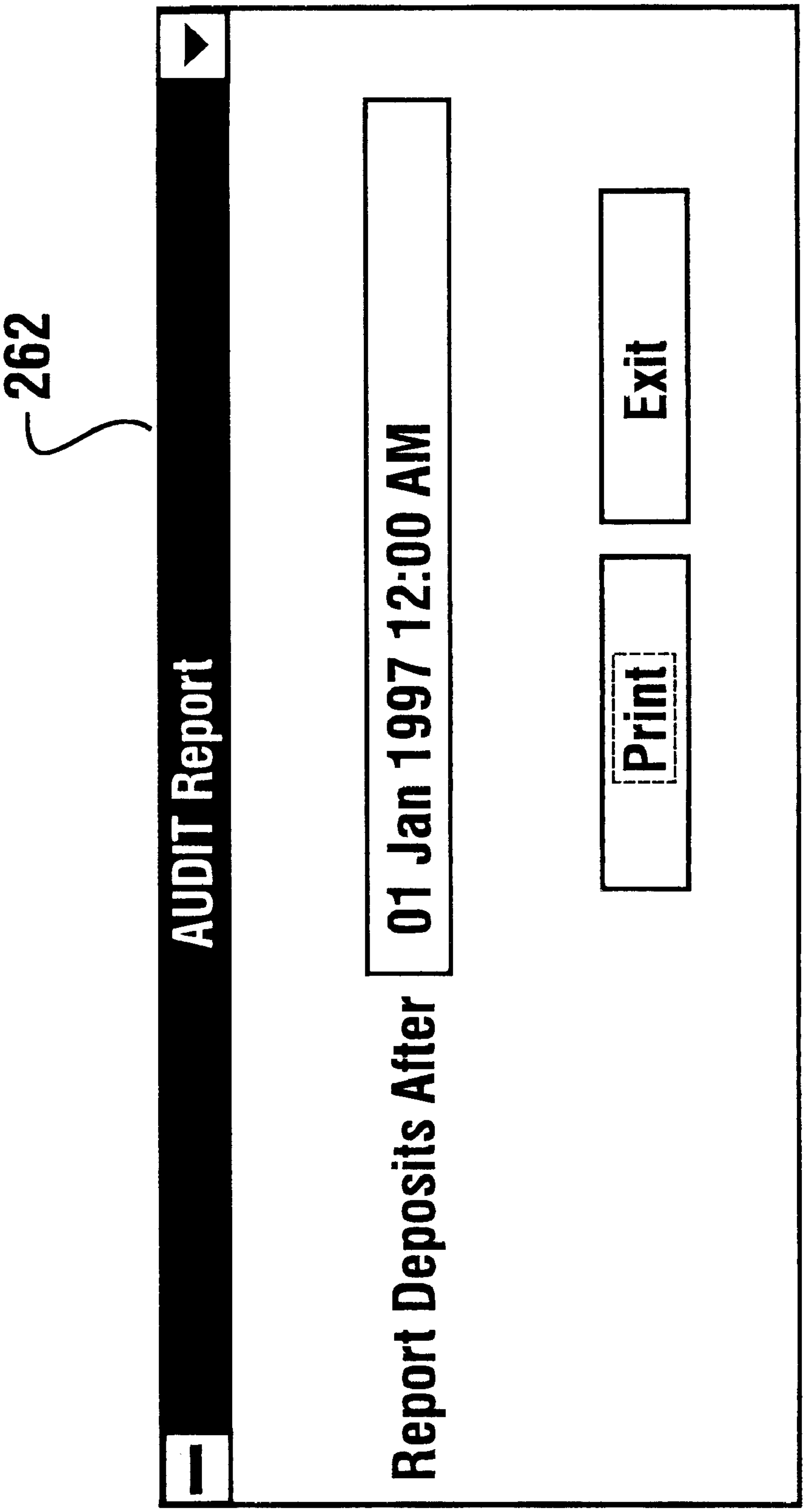
FIG. 35 is an exemplary embodiment of an audit report window which is used by an operator of the remote computer to produce an audit report.

The computer 174 of the exemplary embodiment of the present invention also has the capability of providing an audit report to verify that deposits by customers match the entries of the amounts and other information that customers made on the keypad. Selecting the "audit" input button from the main window 214 causes an audit report window 262 shown in FIG. 35 to be displayed. The audit report window indicates the time and date when the audit information starts based on the date of the last audit printout. The database within the computer 174 maintains this information and produces the report based on data starting after that time and date. Alternatively an operator may input a particular time and date for which to start the inclusion of data in the report.

Figure 36:
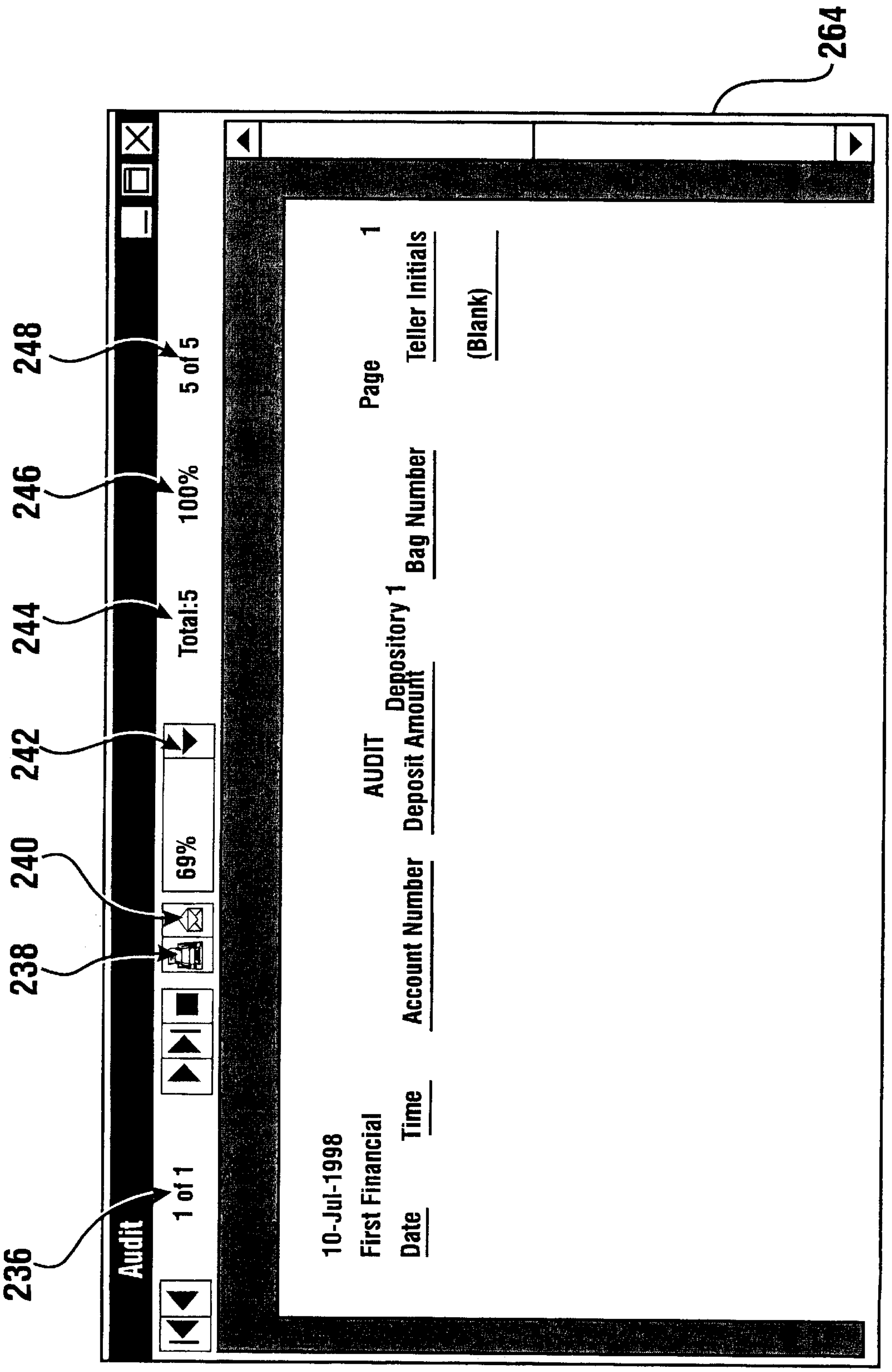
FIG. 36 is an exemplary embodiment of an audit window produced by the remote computer in response to selection of an audit request input.

The audit report is provided for the particular depository and contains information concerning the date, time, account number, deposit amount and bag number for each deposit that was made into the depository. By selecting the "print" button from the audit report window 262 an audit window 264 shown in FIG. 36 is displayed. The audit window 264 has a format similar to the customer report window and includes similar indicators thereon. While exemplary audit window 264 does not include any data, it should be understood that in a system in which a depository has operated for a period of time, all of the columns shown in the report will be populated with the appropriate data. The audit report may be printed or exported by selecting icon 238 or icon 240 respectively. The information provided through the audit window enables the operator to compare the data input with deposits to what is found in each depository and to identify any inaccuracies.

In addition or in the alternative, the audit report window may be communicated to a service person at the depository removing the deposits. This may be done via modem connection through a network 176, by a separate line connection or by a wireless connection. The servicer may receive the data from the printer located in the control panel on the display or on a monitor associated with the video recorder or other monitor at the depository. Alternatively the service person may be provided with a hand held computer or similar device for purposes of receiving the audit data. This enables the service person to check the contents of the depository and to compare it to the data that is stored in the data store of the remote computer 174. Provisions are also made once the contents of a depository have been removed to clear the information at the depository or to include an indication in the data store that the deposits are no longer stored therein. In embodiments of the invention this may be accomplished from the remote computer or by the service person who removes the deposits.

Figure 37:
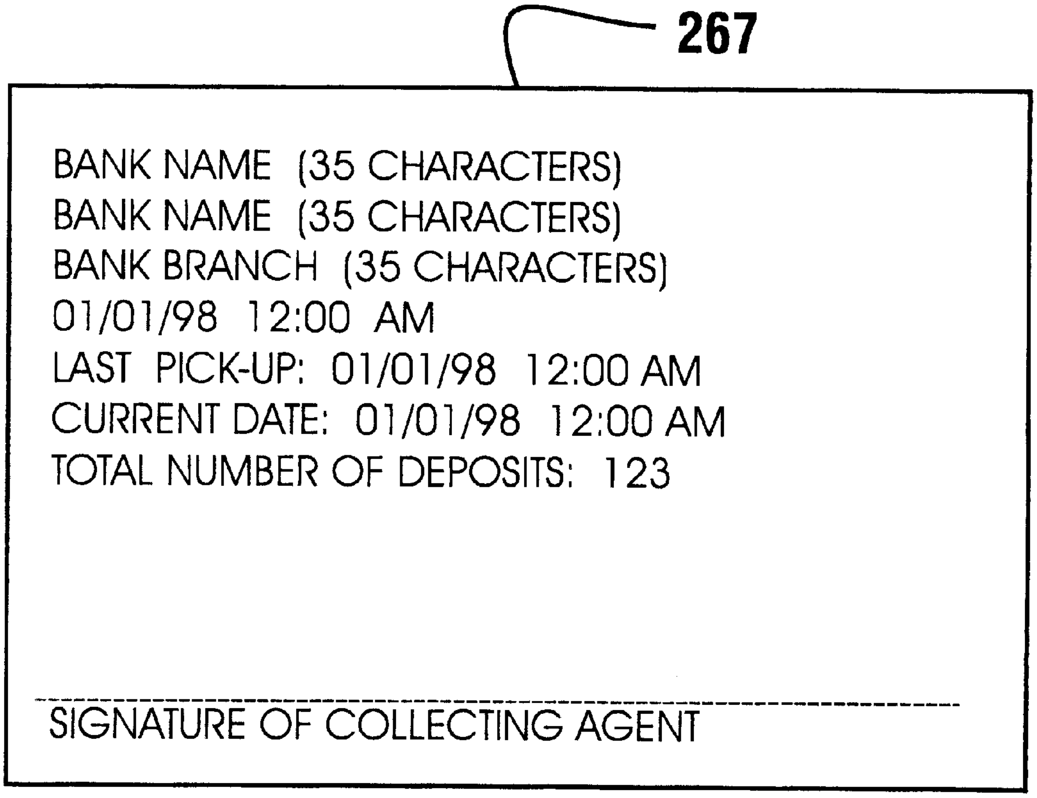
FIG. 37 is an exemplary embodiment of a receipt printed by the printer in a control panel of a secure depository responsive to input of a servicer card indicating that a servicer intends to remove items that have been deposited.

In some embodiments of the invention the computer 174 may configure the data store in the control panel to recognize a card input by a service person. In response to such a card input (and/or PIN or other inputs if required) the processor 70 in the control panel is operative to cause the printer to print a record for the service person such as the depository collection record 267 shown in FIG. 37. The depository collection records 267 includes indicia representative of data stored in the data store 72 during the course of conducting transactions at the machine. The depository collection record indicates the particular bank and location which operates the depository, the time that the record is printed as well as the time period since the depository was last emptied. The depository collection record 267 also includes data representative of the total number of bags which the data store indicates has been received by the depository since the last time the depository was serviced. In the exemplary embodiment once the data is printed the data is cleared or otherwise transferred in memory so it is not provided to a subsequent servicer who next removes deposits.

The depository collection record which is produced in response to the servicer presenting their card, provides the servicer with an indication of the number of bags that should be in the depository. The servicer has access to the interior area of the depository and removes the depository bags therefrom. The servicer may then count the number of depository bags and compare it to the number indicated on the depository collection record. If the actual number of bags conforms to the collection record the servicer may sign and date the record and turn it in with the depository bags for audit. If however there is a discrepancy it may be noted immediately and the source of any discrepancy determined. In the exemplary embodiment if the servicer removed the indicated amount of bags, but a deposit is later lost, the source of the loss may be limited to a particular group of individuals. If there is a discrepancy between deposits noted by the machine and deposits counted by the servicer, image records associated with deposits may be reviewed to determine the cause of the loss.

In the exemplary embodiment the servicers who are enabled to print depository collection records, as well as the required inputs to obtain such records, are determined by the operator based on the inputs to the computer 174. This data is configured in a manner similar to that described in connection with customers through a series of windows which are populated with data which is used to configure the data store at the depository.

It should be understood that the approaches described herein for auditing information about deposits made into the depositories are exemplary and that in other embodiments other or additional steps may be taken in the conduct of such audits. The particular approach employed in any system will depend on the operator of the system and the nature of the persons who handle deposits that have been placed in the depositories. In some situations for example, employees of the bank operating the depositories may be the individuals who are responsible for removing deposits therefrom. In other situations armored carrier services or similar personnel may be responsible for removing deposits and auditing the contents thereof The level of security and the procedures employed will vary depending on the particular processes involved.

As will be appreciated from the foregoing description the systems of the exemplary embodiments of the present invention provide security and are readily operated and configured to accept deposits from customers. Systems of the invention also achieve enhanced tracking of deposits to minimize the risk of loss or misappropriation. Embodiments of the invention also enable the system to be operated in connection with an installed base of existing depositories by retrofitting such depositories with control panels and other components which provide electronic access capabilities but which maintain the integrity and security of the installed depository structures.

Thus the new secure depository system of the invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be deemed limited to the structures shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. A method comprising the steps of:

(a) installing an electrical actuator in an interior area of an existing depository, wherein the electrical actuator is in operative connection with a depository door through which deposits are placed into the depository and wherein the actuator is selectively operative to change the door between a locked condition and an unlocked condition;

(b) mounting a control panel in supporting connection with an exterior face of the depository, wherein the control panel includes at least one of a card reader and a keypad, wherein the at least one of a card reader and keypad are in operative connection with at least one processor, which processor is in operative connection with at least one data store, and wherein the processor is in operative connection with the actuator;

(c) inputting identifying data through the at least one of a card reader and keypad;

(d) comparing through operation of the at least one processor, the input identifying data to data in at least one data store for a corresponding relationship;

(e) operating the actuator to unlock the depository door responsive to operation of the processor, when the identifying data and the data in the data store have the corresponding relationship.

2. The method according to claim 1 wherein in step (b) the control panel is mounted in supporting connection with the exterior face with a fluid conduit extending between the control panel and the exterior face.

3. The method according to claim 1 wherein the control panel includes a key actuator in operative connection with the processor, and further comprising the steps of:

(f) actuating the key actuator with an authorized key;

(g) unlocking the depository door with the electrical actuator responsive to operation of the processor, responsive to the authorized key actuating the key actuator.

4. The method according to claim 1 wherein the control panel includes a card reader and a keypad, and wherein the processor is in operative connection with a communications device, and further comprising the step of connecting the communications device to an ATM network.

5. The method according to claim 4 wherein in step (c) identifying data is input through both the card reader and the keypad, and prior to step (d) further comprising the step of inputting amount data through the keypad, and generating through operation of at least one local processor adjacent the depository, responsive to the identifying data input in step (c) and the input amount data, a first ATM message, and transmitting the first ATM message through the communications device to the ATM network, wherein step (d) is carried out by a remote processor remote from the depository that is connected in the ATM network.

6. The method according to claim 5 and prior to step (e) further comprising the step of receiving through the local processor from the remote processor through the communications device, a second ATM message, wherein step (e) is carried out responsive to receipt of the second ATM message.

7. The method according to claim 6 and further comprising the steps of receiving a deposit into the depository, and generating through operation of the local processor responsive to receipt of the deposit, a third ATM message, and further comprising communicating the third ATM message to the ATM network through the communications device.

8. The method according to claim 1, and prior to step (c) further comprising operatively disconnecting from the door an existing key cylinder on the depository.

9. A method comprising:

(a) installing an electrical actuator in an interior area of an existing depository, wherein the actuator is in operative connection with a depository door through which deposits are placed into the depository and wherein the actuator is selectively operative to change the door between a locked condition and an unlocked condition;

(b) mounting a control panel in supporting connection with an exterior face of the depository, wherein a fluid conduit extends between the control panel and the exterior face, and wherein the control panel includes at least one of a card reader and a keypad in operative connection with at least one processor, which processor is in operative connection with at least one data store, and wherein the processor is in operative connection with the actuator;

(c) inputting identifying data through the at least one of a card reader and keypad;

(d) comparing responsive to operation of the at least one processor, the input identifying data and data in the at least one data store for a corresponding relationship;

(e) operating the actuator to unlock the depository door responsive to operation of the processor, when the identifying data and the data in the data store have the corresponding relationship.

10. A method comprising:

(a) installing at least one electrical actuator in an interior area of an existing depository, wherein the at least one actuator is in operative connection with a depository door, wherein the actuator is selectively operative to change the door between a locked condition and an unlocked condition, wherein in the locked condition deposits are prevented from being placed in the depository and in the unlocked condition deposits are enabled to be placed in the depository; and (b) mounting a control panel apparatus in supporting connection with at least one exterior face of the depository, wherein the control panel apparatus includes at least one of a card reader and a keypad, is in operative connection with the at least one actuator and is operative to cause the at least one actuator to selectively change the door between the locked and unlocked conditions, and wherein a fluid conduit extends between the at least one exterior face and the control panel apparatus.

11. Apparatus produced through the method recited in claim 10.

12. A method comprising:

(a) installing an electrical actuator in an interior area of an existing and previously operative depository, wherein the actuator is in operative connection with a depository door, wherein the actuator is selectively operative to change the door between a locked condition and an unlocked condition, wherein in the locked condition deposits are prevented from being placed in the depository and in the unlocked condition deposits are enabled to be placed in the depository;

(b) mounting a control panel in supporting connection with an exterior of the depository, wherein the control panel includes a processor and at least one of a card reader and a keypad, wherein the at least one of a card reader and keypad are in operative connection with the processor, and wherein the processor is in operative connection with the actuator and at least one data store;

(c) inputting identifying data through the at least one of a card reader and keypad;

(d) comparing responsive to operation of the processor, the identifying data and data in the at least one data store for a corresponding relationship;

(e) operating the actuator to unlock the depository door responsive to operation of the processor, when the identifying data and the data in the data store have the corresponding relationship.

13. A method comprising:

(a) installing an electrical actuator in an interior area of an existing depository, wherein the electrical actuator is in operative connection with a depository door, wherein the actuator is selectively operative to change the door between a locked condition and an unlocked condition, wherein in the locked condition deposits are prevented from being placed in the depository and in the unlocked condition deposits are enabled to be placed in the depository, (b) mounting a control panel in supporting connection with an exterior of the depository, wherein the control panel includes a key actuator and at least one of a card reader and a keypad, wherein the key actuator and the at least one of a card reader and keypad are in operative connection with at least one processor, wherein the processor is in operative connection with the actuator, wherein the processor is operative to cause the actuator to change the door from the locked to the unlocked condition responsive to selected inputs to the at least one of a card reader and a keypad;

(c) actuating the key actuator with an authorized key;

(d) operating the actuator responsive to operation of the processor, to unlock the depository door, responsive to actuating the key actuator with the authorized key.

14. A method comprising:

(a) installing an electrical actuator in an interior of an existing and previously operative depository, wherein the actuator is selectively operative to change the door between a locked condition and an unlocked condition, wherein in the locked condition a deposit is prevented from being placed in the depository and in the unlocked condition a deposit is enabled to be placed in the depository;

(b) mounting a control panel in supporting connection with an exterior of the depository, wherein the control panel includes a processor and at least one of a card reader and a keypad, and wherein the processor is in operative connection with the actuator and at least one data store, and wherein responsive to input of at least one predetermined input to the at least one of a card reader and a keypad, the processor is operative to cause the condition of the door to change from the locked condition to the unlocked condition.

15. The method according to claim 14 wherein in step (b) the control panel includes a key actuator, wherein the processor is further operative to cause the door to change from the locked condition to the unlocked condition responsive to actuation of the key actuator with an authorized key.

16. The method according to claim 15 and further comprising operatively disconnecting a mechanical key cylinder on the depository from operative connection with the door.

17. Apparatus produced through the method recited in claim 14.

* * * * *